US012444938B2

(12) United States Patent
Long et al.

(10) Patent No.: US 12,444,938 B2
(45) Date of Patent: Oct. 14, 2025

(54) POWER DISTRIBUTION CIRCUITS FOR ELECTRICALLY POWERED AIRCRAFT

(71) Applicant: Wisk Aero LLC, Mountain View, CA (US)

(72) Inventors: Geoffrey Alan Long, Montara, CA (US); Lewis Romeo Hom, Mountain View, CA (US); Marko Kalemkeris, Ashland, OR (US); Michael John Burgart, Los Altos, CA (US); Joshua Bender, San Jose, CA (US); Fernando Leite, Lucerne (CH); Arun Gowda, Atlanta, GA (US); Tiago Silva, Lucerne (CH)

(73) Assignee: Wisk Aero LLC, Mountain View, CA (US)

( * ) Notice: Subject to any disclaimer, the term of this patent is extended or adjusted under 35 U.S.C. 154(b) by 70 days.

(21) Appl. No.: 18/458,551

(22) Filed: Aug. 30, 2023

(65) Prior Publication Data
US 2023/0411958 A1 Dec. 21, 2023

Related U.S. Application Data

(63) Continuation-in-part of application No. 17/202,855, filed on Mar. 16, 2021, now Pat. No. 12,227,290.
(Continued)

(51) Int. Cl.
H02P 1/00 (2006.01)
B60L 50/60 (2019.01)
(Continued)

(52) U.S. Cl.
CPC ............. *H02J 1/10* (2013.01); *B60L 50/60* (2019.02); *B64D 27/31* (2024.01); *B64D 27/34* (2024.01);
(Continued)

(58) Field of Classification Search
CPC .......... H02P 21/22; H02P 2101/30; H02J 1/10
See application file for complete search history.

(56) References Cited

U.S. PATENT DOCUMENTS 2,702,168 A 2/1955 Platt
4,504,029 A 3/1985 Eickmann
(Continued)

FOREIGN PATENT DOCUMENTS

CN 103429891 A 12/2013
CN 106253242 A 12/2016
(Continued)

OTHER PUBLICATIONS

NZ799477, "First Examination Report", Nov. 14, 2024, 6 pages.
(Continued)

*Primary Examiner* — Karen Masih
(74) *Attorney, Agent, or Firm* — Kilpatrick Townsend & Stockton LLP

(57) ABSTRACT

A power distribution circuit for an electrically powered aircraft includes a plurality of batteries and a plurality of electric propulsion systems. A plurality of power distribution circuits each couple a battery of the plurality of batteries to two or more electric propulsion systems. The plurality of electric propulsion systems are positioned on the aircraft to apply balanced forces to the aircraft such that in the event of a failure, the aircraft remains stable and only experiences a loss in altitude or speed.

20 Claims, 15 Drawing Sheets

Related U.S. Application Data

(60) Provisional application No. 63/106,197, filed on Oct. 27, 2020.

(51) Int. Cl.
   *B64D 27/31* (2024.01)
   *B64D 27/34* (2024.01)
   *B64D 27/357* (2024.01)
   *H02J 1/10* (2006.01)

(52) U.S. Cl.
   CPC ........ *B64D 27/357* (2024.01); *B60L 2200/10* (2013.01); *B64D 2221/00* (2013.01)

(56) References Cited

U.S. PATENT DOCUMENTS

| | | | |
|---|---|---|---|
| 5,195,702 | A | 3/1993 | Malvestuto, Jr. |
| 6,247,667 | B1 | 6/2001 | Fenny et al. |
| 6,415,242 | B1 | 7/2002 | Weldon, Jr. et al. |
| 10,589,838 | B1 | 3/2020 | Suppes |
| 2003/0094537 | A1 | 5/2003 | Austen-Brown |
| 2004/0042145 | A1 | 3/2004 | Garnett |
| 2008/0197961 | A1 | 8/2008 | Patel |
| 2012/0234968 | A1 | 9/2012 | Smith |
| 2014/0032002 | A1 | 1/2014 | Iwashima et al. |
| 2014/0097290 | A1 | 4/2014 | Leng |
| 2015/0136897 | A1 | 5/2015 | Seibel et al. |
| 2016/0083075 | A1 | 3/2016 | Moxon |
| 2018/0057155 | A1 | 3/2018 | Reichert et al. |
| 2018/0186464 | A1 | 7/2018 | Woodworth et al. |
| 2018/0312248 | A1 | 11/2018 | Leng |
| 2019/0291856 | A1 | 9/2019 | Kaufman et al. |
| 2019/0384288 | A1 | 12/2019 | Gu |
| 2020/0010187 | A1 | 1/2020 | Bevirt et al. |
| 2020/0140079 | A1 | 5/2020 | Campbell |
| 2020/0156780 | A1 | 5/2020 | Varigas |
| 2020/0164975 | A1 | 5/2020 | Robertson et al. |
| 2020/0164995 | A1 | 5/2020 | Lovering et al. |
| 2020/0207467 | A1 | 7/2020 | Morgan |
| 2020/0346777 | A1* | 11/2020 | Tong ............... B64C 25/40 |
| 2021/0112734 | A1* | 4/2021 | Carmen ............ A01B 45/026 |
| 2021/0206487 | A1 | 7/2021 | Iqbal et al. |
| 2021/0300527 | A1 | 9/2021 | Thalheimer |
| 2021/0339881 | A1 | 11/2021 | Bevirt et al. |
| 2022/0009625 | A1 | 1/2022 | Bower et al. |
| 2022/0024572 | A1 | 1/2022 | Vanni et al. |
| 2022/0127011 | A1 | 4/2022 | Long et al. |
| 2022/0250759 | A1 | 8/2022 | Yu et al. |

FOREIGN PATENT DOCUMENTS

| | | | | |
|---|---|---|---|---|
| CN | 108602558 | A | | 9/2018 |
| CN | 109263902 | A | | 1/2019 |
| CN | 110963052 | A | * | 4/2020 |
| CN | 111051201 | A | | 4/2020 |
| CN | 111108661 | A | | 5/2020 |
| CN | 111225853 | A | | 6/2020 |
| CN | 111452981 | A | | 7/2020 |
| CN | 111572766 | A | | 8/2020 |
| DE | 1406514 | A1 | | 10/1968 |
| DE | 202013007001 | U1 | * | 10/2013 ......... H01M 2/0207 |
| EP | 3466813 | A1 | | 4/2019 |
| EP | 3647193 | A1 | | 5/2020 |
| JP | 2001001995 | A | | 1/2001 |
| JP | 2002153027 | A | | 5/2002 |
| JP | 2010220465 | A | | 9/2010 |
| JP | 2018537348 | A | | 12/2018 |
| JP | 2020097419 | A | | 6/2020 |
| KR | 20230093315 | A | | 6/2023 |
| WO | 2018203036 | A1 | | 11/2018 |
| WO | 2019006469 | A1 | | 1/2019 |
| WO | 2020058706 | A1 | | 3/2020 |
| WO | 2022010971 | A1 | | 1/2022 |

OTHER PUBLICATIONS

U.S. Appl. No. 17/202,855 , "Corrected Notice of Allowability", Mar. 14, 2024, 2 pages.
U.S. Appl. No. 17/202,855 , "Notice of Allowance", Mar. 6, 2024, 7 pages.
U.S. Appl. No. 17/512,433 , "Notice of Allowance", Feb. 20, 2024, 13 pages.
U.S. Appl. No. 17/202,855 , "Notice of Allowance", Oct. 24, 2024, 2 pages.
EP21887348.7 , "Extended European Search Report", Oct. 15, 2024, 11 pages.
KR10-2023-7017731 , "Office Action", Oct. 7, 2024, 11 pages.
NZ799498 , "First Examination Report", Sep. 30, 2024, 4 pages.
U.S. Appl. No. 17/512,433 , "Non-Final Office Action", Nov. 22, 2023, 11 pages.
AU2021368019 , "First Examination Report", May 28, 2024, 5 pages.
U.S. Appl. No. 17/202,855 , "Corrected Notice of Allowability", Dec. 18, 2024, 2 pages.
PCT/US2024/039144 , "International Search Report and Written Opinion", Dec. 5, 2024, 13 pages.
U.S. Appl. No. 17/202,855 , "Non-Final Office Action", Aug. 25, 2023,.
PCT/US2021/056667 , "International Preliminary Report on Patentability", May 11, 2023, 9 pages.
PCT/US2021/056667 , "International Search Report and Written Opinion", Jan. 28, 2022, 10 pages.
PCT/US2021/056891 , "International Preliminary Report on Patentability", May 11, 2023, 8 pages.
PCT/US2021/056891 , "International Search Report and Written Opinion", Feb. 1, 2022, 9 pages.
CA3195314 , "Office Action", Sep. 19, 2024, 4 pages.
EP21887460.0 , "Extended European Search Report", Sep. 16, 2024, 11 pages.
Finger et al., "A Review of Configuration Design for Distributed Propulsion Transitioning VTOL Aircraft", Asia-Pacific International Symposium on Aerospace Technology, Nov. 4, 2017, pp. 1-15.
PCT/US2024/039144 , "Invitation to Pay Additional Fees and, Where Applicable, Protest Fee", Sep. 24, 2024, 2 pages.
NZ799477 , "Second Examination Report", Mar. 17, 2025, 7 pages.
NZ799498 , "Second Examination Report", Feb. 24, 2025, 2 pages.
Application No. IL302028 , Office Action, Mailed On Jun. 25, 2025, 3 pages.
Application No. JP2023-524286 , Office Action, Mailed On Jun. 3, 2025, 6 pages.
NZ799477 , "Third Examination Report", May 28, 2025, 6 pages.

* cited by examiner

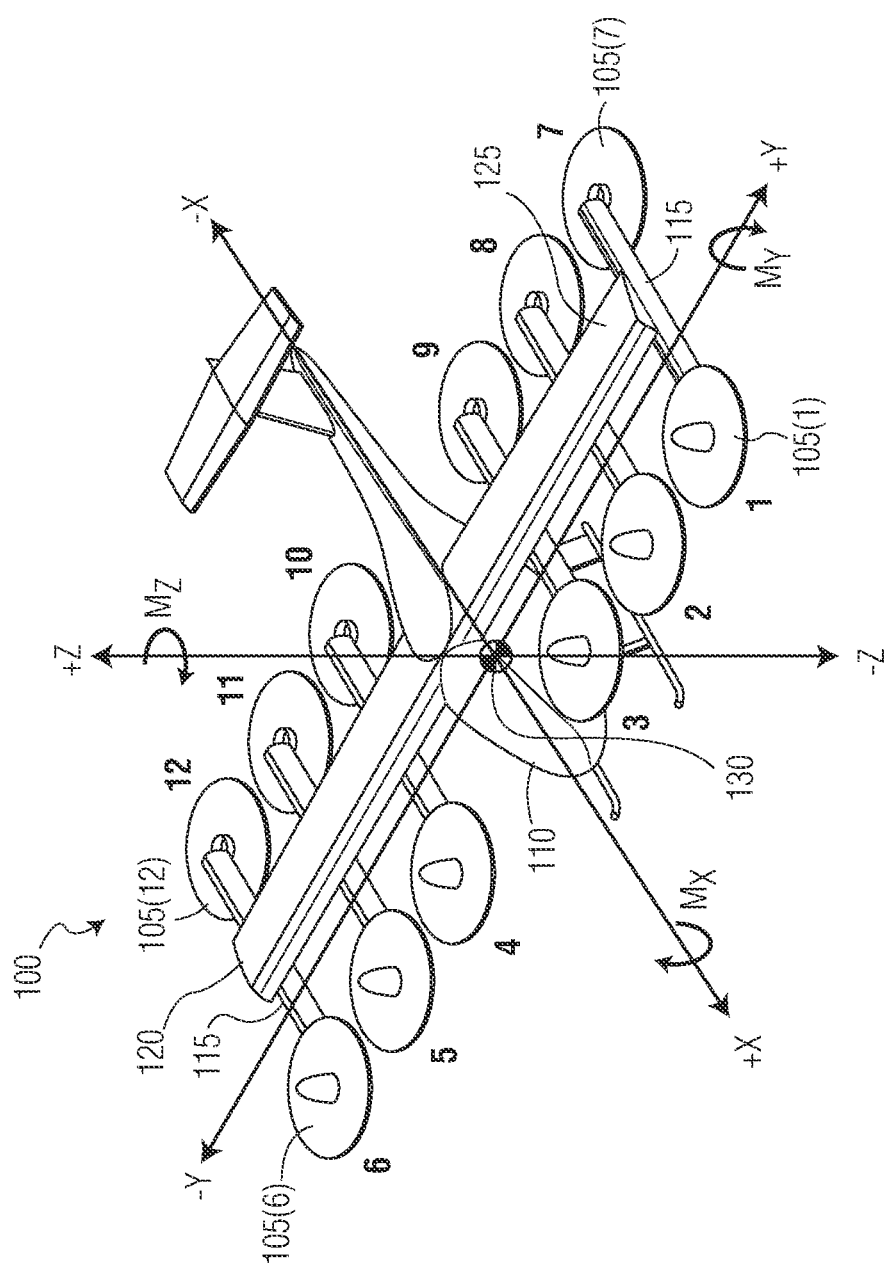

POWER DISTRIBUTION CIRCUITS FOR ELECTRICALLY POWERED AIRCRAFT

CROSS-REFERENCES TO OTHER APPLICATIONS

This application is a Continuation in Part of U.S. patent application Ser. No. 17/202,855 "POWER DISTRIBUTION CIRCUITS FOR ELECTRICALLY POWERED AIRCRAFT" filed on Mar. 16, 2021, which claims priority to U.S. provisional patent application Ser. No. 63/106,197 "VTOL AIRCRAFT FAN TILTING MECHANISMS AND ARRANGEMENTS" filed on Oct. 27, 2020, the contents of which is hereby incorporated by reference in entirety for all purposes.

FIELD

The described embodiments relate generally to a power distribution system for rechargeable electric vehicles. More particularly, the present embodiments relate to a plurality of isolated power distribution circuits that enable redundant power distribution to balanced propulsion systems for electrically powered aircraft.

BACKGROUND

Electrically powered aircraft employ a plurality of propulsion systems powered by a two or more batteries for reliability and maneuverability. New power distribution circuits are needed that enable improved redundancy and aircraft stability in the case of various types of failure events.

SUMMARY

In some embodiments a power distribution system for an electrically powered aircraft is disclosed that includes a plurality of batteries and a plurality of electric propulsion systems. The power distribution system also includes a plurality of power distribution circuits, each coupling a respective battery of the plurality of batteries to two or more respective electric propulsion systems of the plurality of electric propulsion systems, the two or more respective electric propulsion systems positioned on the electrically powered aircraft to apply balanced forces to the electrically powered aircraft. The power distribution system further includes a plurality of electrical busses, each electrical bus coupling a respective pair of power distribution circuits from the plurality of power distribution circuits, and wherein the each of the plurality of electrical busses couple two respective batteries of the plurality of batteries to four electric propulsion systems of the plurality of electric propulsion systems.

In some embodiments, the power distribution system further includes a plurality of contactors, each of which is coupled to a respective battery of the plurality of batteries and a respective electrical bus of the plurality of electrical busses, and each of which is configured to decouple their respective battery from their respective electrical bus.

In various embodiments, the power distribution system further includes a plurality of current meters, each of which is coupled to a respective battery of the plurality of batteries, and each of which is configured to measure current entering or exiting the respective battery, such that the respective battery can be decoupled from its respective electrical bus of the plurality of electrical busses when a maximum threshold current is exceeded or a minimum threshold current is not satisfied.

In some embodiments, the plurality of batteries is twelve batteries, the plurality of electric propulsion systems is twelve electric propulsion systems, the plurality of power distribution circuits is twelve power distribution circuits, the plurality of electrical busses is six electrical busses, and the plurality of current meters is twelve current meters.

In various embodiments, each of the twelve batteries is one battery module. In some embodiments, the balanced forces applied to the electrically powered aircraft are balanced with respect to a center of gravity (CG) of the electrically powered aircraft. In some embodiments, the two or more respective electric propulsion systems are diametrically opposed from one another with respect to a center of gravity (CG) of the electrically powered aircraft.

In some embodiments a power distribution system for an electrically powered includes a first and a second battery. A first electric propulsion system generates a first force and a second electric propulsion system generates a second force, where the first and the second forces are balanced with respect to a center of gravity of the aircraft. The power distribution system also includes a third electric propulsion system that generates a third force, and a fourth electric propulsion system that generates a fourth force, wherein the third and the fourth forces are balanced with respect to the center of gravity of the electrically powered aircraft. A first power distribution circuit couples the first battery to the first electric propulsion system and the second electric propulsion system, and a second power distribution circuit couples the second battery to the third electric propulsion system and the fourth electric propulsion system. The power distribution system also includes an electrical bus coupling the first power distribution circuit and the second power distribution circuit, such that the electrical bus couples the first battery and the second battery to the first electric propulsion system, the second electric propulsion system, the third electric propulsion system, and the fourth electric propulsion system.

In various embodiments, the power distribution system further comprises a first contactor coupled to the first battery and the electrical bus, the first contactor being configured to decouple the first battery from the electrical bus, and a second contactor coupled to the second battery and the electrical bus, the second contactor being configured to decouple the second battery from the electrical bus.

In some embodiments, the power distribution system further includes a first current meter coupled to the first battery, the first current meter being configured to measure current entering or exiting the first battery, such that the first battery can be decoupled from the electrical bus when a maximum threshold current is exceeded or a minimum threshold current is not satisfied, as well as a second current meter coupled to the second battery, the second current meter being configured to measure current entering or exiting the second battery, such that the second battery can be decoupled from the electrical bus when the maximum threshold current is exceeded or the minimum threshold current is not satisfied.

In some embodiments, the first battery has a single battery module, and the second battery has a single battery module.

In some embodiments, the first electric propulsion system is attached to a first wing of the electrically powered aircraft, the second electric propulsion system is attached to a second wing of the electrically powered aircraft, the third electric propulsion system is attached to the first wing of the electrically powered aircraft, and the fourth electric propulsion system is attached to the second wing of the electrically powered aircraft.

In various embodiments, the power distribution system further includes a third power distribution circuit coupling a third battery to the first electric propulsion system and the second electric propulsion system, and a fourth power distribution circuit coupling a fourth battery to the third electric propulsion system and the fourth electric propulsion system, wherein the first power distribution circuit and the second power distribution circuit are both primary power distribution circuits, and wherein the third power distribution circuit and the fourth power distribution circuit are both redundant power distribution circuits.

In various embodiments, the power distribution system further includes a third power distribution circuit coupling a third battery to the first electric propulsion system and the second electric propulsion system, and a fourth power distribution circuit coupling a fourth battery to the third electric propulsion system and the fourth electric propulsion system, wherein the first power distribution circuit and the fourth power distribution circuit are both primary power distribution circuits, and wherein the second power distribution circuit and the third power distribution circuit are both redundant power distribution circuits.

In some embodiments a method of powering an aircraft is disclosed that comprises providing electrical power to a first electric propulsion system and a second electric propulsion system via a first power distribution circuit coupled to a first battery, wherein the first electric propulsion system is attached to a left wing of the aircraft and the second electric propulsion system is attached to a right wing of the aircraft such that the first electric propulsion system and the second electric propulsion system apply respective forces that are balanced about a center of gravity of the aircraft. The method also includes providing electrical power to third electric propulsion system and fourth electric propulsion system via a second power distribution circuit coupled to a second battery, wherein the third electric propulsion system is attached to the left wing of the aircraft and the fourth electric propulsion system is attached to the right wing of the aircraft such that the third electric propulsion system and the fourth electric propulsion system apply respective forces that are balanced about the center of gravity of the aircraft, wherein an electrical bus couples the first power distribution circuit and the second power distribution circuit, such that the electrical bus couples the first battery and the second battery to the first electric propulsion system, the second electric propulsion system, the third electric propulsion system, and the fourth electric propulsion system, wherein a first contactor is coupled to the first battery and the electrical bus, the first contactor being configured to decouple the first battery from the electrical bus, and a second contactor is coupled to the second battery and the electrical bus, the second contactor being configured to decouple the second battery from the electrical bus. The method further includes decoupling the first battery from the electrical bus in response to failure of the first battery. In various embodiments, the first battery has a single battery module, and the second battery has a single battery module.

In some embodiments an aircraft is disclosed that comprises a fuselage, a pair of wings coupled to opposite sides of the fuselage, and a flat battery housing positioned in a horizontal orientation at an aft area of the fuselage. The flat battery housing includes twelve battery slots arranged in two rows of six battery slots in the same horizontal plane, where each of the twelve battery slots has space for one battery, and twelve batteries disposed within the twelve battery slots.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 1A and 1B are simplified isometric views of an electrically powered aircraft in vertical (FIG. 1A) and horizontal (FIG. 1B) flight configuration according to an embodiment of the disclosure;

DETAILED DESCRIPTION

Techniques disclosed herein relate generally to an electrically powered aircraft including a plurality of tilting electric propulsion systems. More specifically, techniques disclosed herein provide a power distribution system including a plurality of isolated power distribution circuits that are coupled to separate batteries via contactors. Each power distribution circuit supplies power to a plurality of balanced electric propulsion systems so a power system failure results in a stable change in speed or altitude of the aircraft, but no rotation. Various inventive embodiments are described herein, including methods, processes, systems, devices, and the like.

In order to better appreciate the features and aspects of the power distribution systems for electrically powered aircraft according to the present disclosure, further context for the disclosure is provided in the following section by discussing particular implementations of an electrically powered vertical takeoff and landing (VTOL) aircraft according to embodiments of the present disclosure. These embodiments are for example only and power distribution systems can be employed in other types of electrically powered vehicles than those depicted herein.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1B:
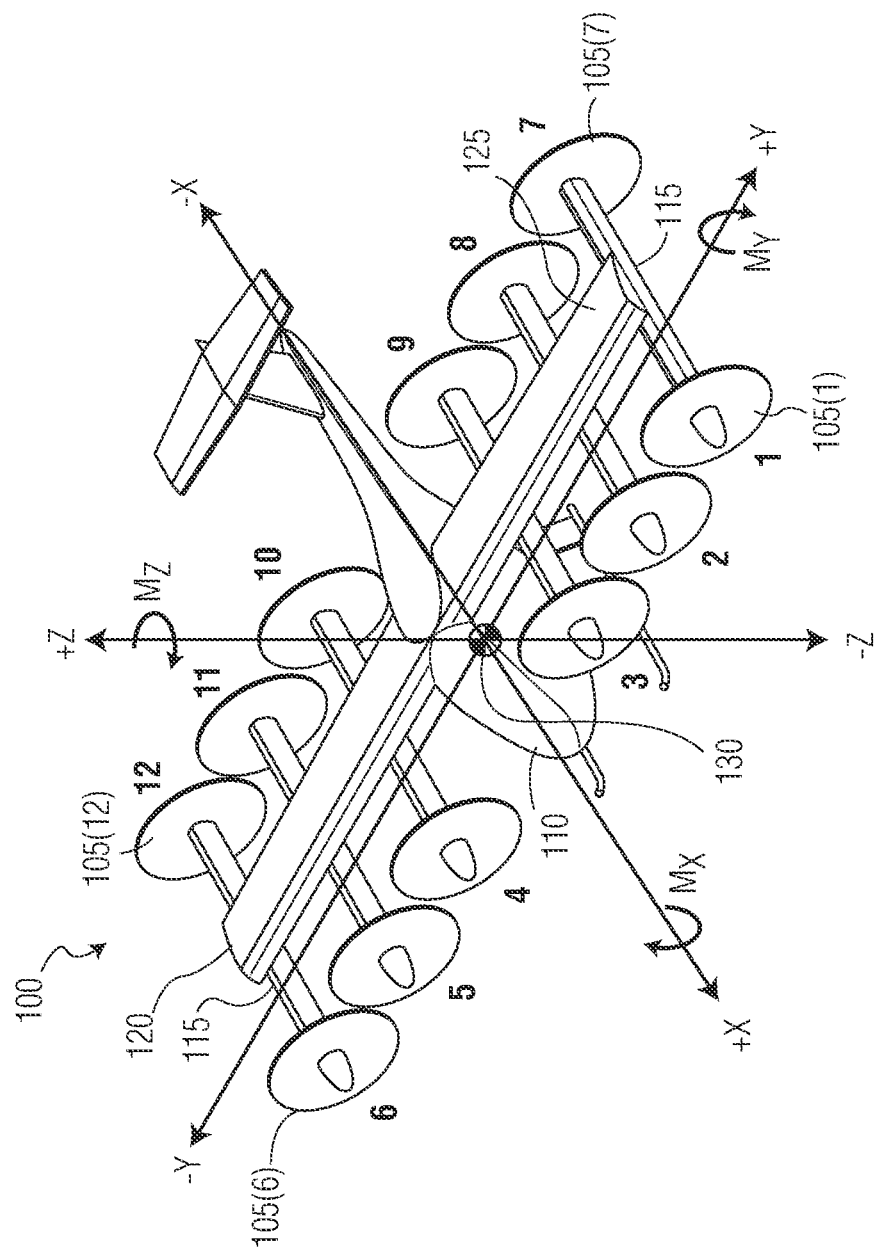

FIGS. 1A and 1B depict simplified isometric drawings of an electrically powered VTOL aircraft 100 with twelve tilting electronic propulsion systems 105(1)-105(12), according to embodiments of the disclosure. More specifically, FIG. 1A depicts aircraft 100 in a vertical flight configuration and FIG. 1B depicts aircraft 100 in a horizontal flight configuration.

As shown in FIGS. 1A and 1B, in some embodiments, aircraft 100 may be configured to carry one or more passengers and/or cargo, and may be controlled automatically and/or remotely (e.g. may not require an on-board pilot to operate the aircraft). In the example shown, aircraft 100 includes a fuselage 110 that may include a cabin section for carrying passengers and/or cargo. Propulsion systems 105(1)-105(12) may be mounted on opposite ends of booms 115. One or more booms 115 may be coupled to each wing 120, 125 of the aircraft 100 to enable aircraft 100 to have any number of propulsion systems 105. For example, each wing 120, 125 may include three booms 115, with each boom including a pair of tilting electronic propulsion systems 105 mounted thereon.

Aircraft 100 is illustrated in FIGS. 1A and 1B using three mutually perpendicular coordinate axes X, Y and Z, at the intersection of which is the aircraft center of gravity (CG) 130. Aircraft 100 has six degrees of freedom including forces in each coordinate axis direction Fx, Fy, Fz and moments about each coordinate axis Mx, My, Mz. Aircraft 100 includes a left wing 125 opposite a right wing 120 which are both attached to fuselage 110. In this embodiment propulsion systems 105 are distributed along each wing 120, 125 with an equal number on left wing 125, an equal number on right wing 120, an equal number in front of each wing and an equal number behind each wing. The equal distribution of propulsion systems 105 about CG 130 of aircraft 100 enables straight and level flight by applying equal power to each propulsion system due to all forces applied by each propulsion system being balanced about the CG. Of course, changes in applied forces and moments can be controlled by changing power supplied to one or more of propulsion systems 105.

Aircraft 100 includes a power distribution system (not shown in FIGS. 1A and 1B) that delivers power from a plurality of batteries to each propulsion system 105, as described in more detail below. In one embodiment, each power distribution circuit includes at least two propulsion systems 105 that are balanced about CG 130 so that if the power distribution circuit fails, the forces applied to the aircraft from the propulsion systems are balanced about the CG. For example propulsion systems 105(1) and 105(12) may be on one power distribution circuit and propulsion systems 105(6) and 105(7) may be on a different power distribution circuit.

If either power distribution circuit fails, for example in the configuration shown in FIG. 1A, aircraft 100 will only experience a change in force along the Z axis (Fz) and there will be no change in other forces or moments (Fx, Fy, Mx, My or Mz) so the aircraft will at most change altitude but will not pitch or roll. Other examples of balanced propulsion systems are 2, 11; 5, 8; 3, 10; 4, 9; 1, 6, 7, 12; 2, 5, 8, 11 and 3, 4, 9, 10 in addition to others. One of ordinary skill the art will appreciate that the number and location of the electronic propulsion systems 105 is not limited to that illustrated in FIGS. 1A-1B and that an aircraft can include less or more propulsion systems, provided at other positions on the aircraft, etc.

Figure 2:
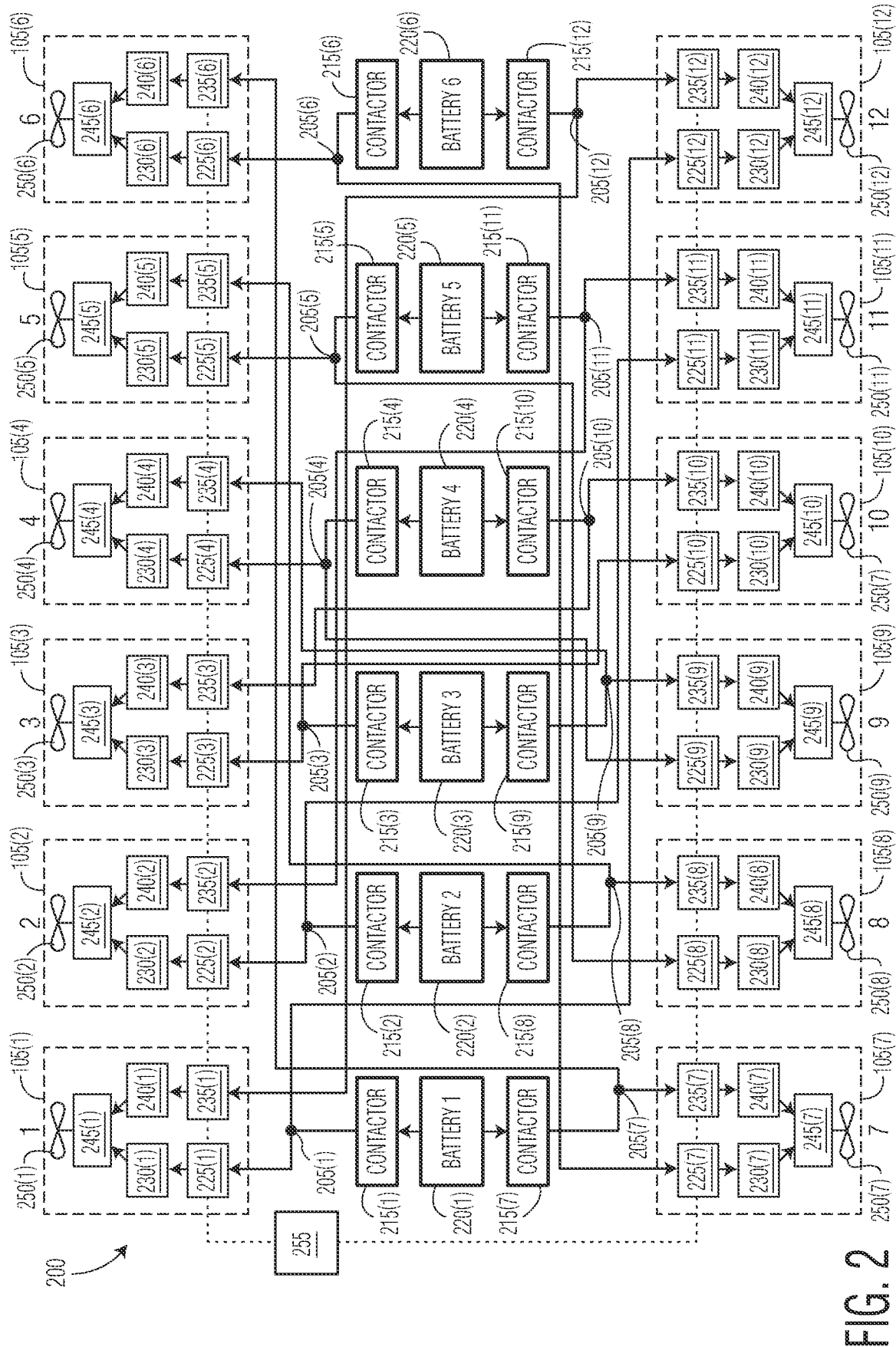
FIG. 2 is a simplified schematic of a power distribution system including six isolated primary power distribution circuits and six isolated redundant power distribution circuits for the electronically powered aircraft shown in FIGS. 1A and 1B.

FIG. 2 illustrates a simplified power distribution system 200 for aircraft 100 illustrated in FIGS. 1A and 1B. As shown in FIG. 2, power distribution system 200 includes twelve isolated power distribution circuits 205(1)-205(12), each coupled through a contactor 215(1)-215(12) to one of six batteries 220(1)-220(6) and arranged to supply power to two or more propulsion systems 105 that are balanced about CG 130 (see FIGS. 1A, 1B), as described in more detail below. More specifically, in this particular embodiment there are six primary isolated power distribution circuits 205(1)-205(6) and six redundant isolated power distribution circuits 205(7)-205(12). Each power distribution circuit 205 supplies power to a balanced pair of propulsion systems.

For example, primary power distribution circuit 205(1) is coupled to battery 1 220(1) through contactor 215(1) and supplies power to balanced propulsion systems 105(1) and 105(12). As shown in FIGS. 1A and 1B, propulsion systems 105(1) and 105(12) are balanced about CG 130 (see FIGS. 1A, 1B) because propulsion system 105(1) is the same distance along left wing 125 (e.g., +Y-axis) from CG 130 that propulsion system 105(12) is along right wing 120 from the CG, providing a balanced moment Mx about the X-axis. Further, propulsion system 105(1) is a same distance forward (along +X-axis) of CG 130 that propulsion system 105(12) is aft (along −X-axis) of the CG, providing a balanced moment My about the Y-axis. The balanced propulsion systems can also be called "diametrically opposed" with respect to CG 130. Thus, if battery 220(1) supplies increased or decreased power to power distribution circuit 205(1), aircraft 100 as shown in FIG. 1A will only raise or lower (e.g., change of force along Z-axis), but will not rotate about the X, Y or Z axes (in the flight configuration shown in FIG. 1).

In this particular embodiment each propulsion system 105 includes a primary controller 225(1)-225(12) coupled to a primary winding 230(1)-230(12) and a redundant controller 235(1)-235(12) coupled to a redundant winding 240(1)-240(12). Primary winding 230(1)-230(12) and redundant winding 240(1)-240(12) each couple power to a respective shaft 245(1)-245(12) that rotates a respective propeller 250(1)-250(12). Primary controller 225 and primary winding 230 are electrically isolated from redundant controller 235 and redundant winding 240 such that if one controller or winding fails, shaft 245 still receives ½ power from the other controller and winding.

For example, propulsion system 105(1) receives ½ power from battery 220(1) through primary power distribution circuit 205(1) that is coupled to primary controller 225(1) and primary winding 230(1) and receives ½ power from battery 220(6) through redundant power distribution circuit 205(12) that is coupled to redundant controller 235(1) and redundant winding 240(1). Thus, if battery 220(1) fails, propulsion system 105(1) still receives ½ power from battery 6 220(6). Since propulsion systems 105(1) and 105(12) are balanced, the power to each propulsion system is the same. In some embodiments a control or computing system 255 is used and can compensate and boost power supplied from battery 6 220(6) to propulsion systems 105(1) and 105(12) to compensate for the loss of ½ power due to a failure of battery 1 220(1).

In a like manner, battery 2 220(2) supplies power to propulsion systems 105(2) and 105(11) through primary power distribution circuit 205(2); battery 3 220(3) supplies power to propulsion systems 105(3) and 105(10) through primary power distribution circuit 205(3); battery 4 220(4) supplies power to propulsion systems 105(4) and 105(9) through primary power distribution circuit 205(4), battery 5 220(5) supplies power to propulsion systems 105(5) and 105(8) through primary power distribution circuit 205(5) and battery 6 220(6) supplies power to propulsion systems 105(6) and 105(7) through primary power distribution circuit 205(6).

In this embodiment there are also six redundant power distribution circuits 205(7)-205(12). Battery 1 220(1) supplies power to propulsion systems 105(6) and 105(7) through redundant power distribution circuit 205(7); battery 2 220(2) supplies power to propulsion systems 105(5) and 105(8) through redundant power distribution circuit 205(8); battery 3 220(3) supplies power to propulsion systems 105(4) and 105(9) through redundant power distribution circuit 205(9); battery 4 220(4) supplies power to propulsion systems 105(3) and 105(10) through redundant power distribution circuit 205(10); battery 5 220(5) supplies power to propulsion systems 105(2) and 105(11) through redundant power distribution circuit 205(5); battery 6 220(6) supplies power to propulsion systems 105(1) and 105(12) through redundant power distribution circuit 205(6). As appreciated by one of skill having the benefit of this disclosure other arrangements of primary and redundant power distribution circuits and propulsion systems are within the scope of this disclosure.

As shown in FIG. 2, each primary and redundant power distribution circuit 205 is coupled to a respective battery 220 via a respective contactor 215(1)-215(12). That is, each contactor 215 controls power supplied to a balanced pair of propulsion systems 105 via a respective power distribution circuit 205. In some embodiments each contactor 215 is an electromechanical relay while in other embodiments it can be a different device, including but not limited to one or more solid-state switches. In various embodiments contactor 215 can be controlled with a current sensing circuit that senses a current flowing into or out of the respective battery 220. When the current reaches a predetermined threshold, contactor 215 can open, breaking the connection between the battery 220 and the respective power distribution circuit 205. Each power distribution circuit 205 shown in FIG. 2 by a single line is representative of a DC circuit that includes at least a power and a ground conductor. In some embodiments a common ground conductor can be used for two or more power distribution circuits 205. In various embodiments contactors 215 can be positioned between only the positive or the ground conductor and battery 220 while in other embodiments they can be positioned between both the power and the ground conductors. In further embodiments fuses can be used in place of contactors 215 or in addition to contactors.

In some embodiments control system 255 can be coupled to controllers 225,235, contactors 215 and/or batteries 220 to control one or more functions of power distribution system 200, as described in more detail below. In one embodiment, control system 255 can make adjustments in one or more controllers 225, 235 to maintain batteries 220 at a similar charge state. More specifically, in some embodiments one or more batteries 220 may be aged (e.g., older or having experienced more discharge cycles) and have a reduced charge capacity and/or one or more batteries may be swapped for a freshly charged battery such that batteries have an unequal charge state. Control system 255 can receive information from each battery 220 related to its charge state and adjust power drawn from each battery by adjusting an operation of one or more controllers 225, 235.

In some embodiments each controller 225, 235 includes an inverter that receives DC power from power distribution circuit 205 and converts it to AC power that is supplied to motor windings 230, 240 in terms of torque, rpm, blade pitch angle, etc. In various embodiments each propulsion system 105 includes an AC motor, however in other embodiments it can include multiple motors coupled to a single shaft and in further embodiments can be a DC motor. In some embodiments, such as shown in FIGS. 1A and 1B, aircraft 100 is over-actuated, that is it has more propulsion systems 105 (e.g., 12) than degrees of freedom (e.g., 6) and therefore control system 255 can adjust myriad combinations of controllers 225, 235 to discharge a particular battery 220 faster or slower than others to maintain an equal charge state among all of the batteries. Thus, control system 255 can use forces and moments (e.g., Fx, Fy, Fz, Mx, My, Mz) and charge state of batteries 220 as inputs and can output commands to controllers 225, 235 to optimize charge state, and power usage.

In some embodiments the balanced arrangement of the propulsion systems 105 on aircraft 100 enables even discharge of batteries 220 during cross-winds and other conditions. For example, as shown in FIG. 1A a cross-wind approaching from the left (e.g., from propulsion systems 105(1), 105(7) towards propulsion systems 105(6), 105(12) causes power draw from propulsion systems 105(1) and 105(7) to reduce and power draw from propulsion systems 105(6) and 105(12) to increase. However, as shown in FIG. 2, propulsion systems 105(1) and 105(12) are coupled to the same batteries (e.g., batteries 220(1) and 220(6)) thus the increased power draw of 105(12) offsets the decreased power draw of 105(1), thus batteries 220(1) and 220(6) maintain a relatively similar rate of discharge as batteries 220(2)-220(5). Similarly, propulsion systems 105(6) and 105(7) are balanced.

In some embodiments one or more diodes can be coupled in-series with power distribution circuits such that current can only flow out of batteries and not into batteries to protect the power distribution system in case of a shorted battery. In other embodiments power distribution system enables regenerative charging in which propulsion systems generate energy (e.g., during descent) and transfer power to batteries.

Figure 3:
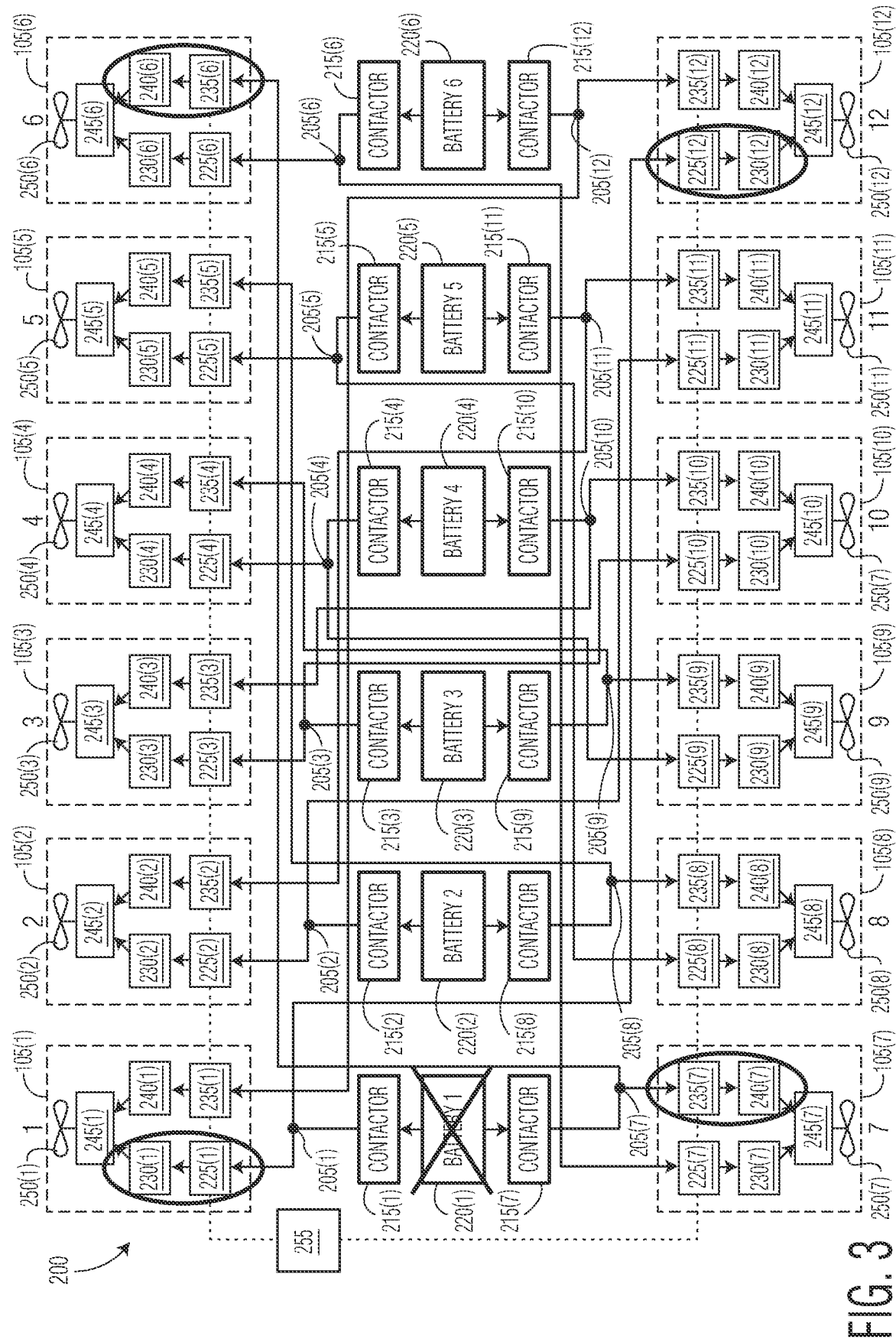
FIG. 3 is the schematic of the power distribution system shown in FIG. 2 showing the effect of a battery failure.

FIGS. 3-6 illustrate the operation of power distribution system 200 in the event of example failure modes. Other failure modes and responses to failure modes by power distribution system, although not shown, are within the scope of this disclosure. FIG. 3 illustrates the power distribution system 200 shown in FIG. 2, however in FIG. 3 battery 220(1) is shown as failed. As shown in FIG. 3, failed battery 220(1) causes contactor 215(1) and contactor 215(7) to open such that power is no longer supplied to propulsion system 105(1) via primary controller 225(1), to propulsion system 105(12) via primary controller 225(12) to propulsion system 105(6) via redundant controller 235(6) and to propulsion system 105(7) via redundant controller 235(7). Thus, propulsion systems 105(1), 105(6), 105(7) and 105 (12) receive ½ the power that they were receiving before battery 220(1) failure.

As described above, in some embodiments control system 255 can detect the failure, open contactors 215(1), 215(7) and immediately increase power to propulsion systems 105(1), 105(6), 105(7) and 105(12) from battery 220(6) to restore 100% power to the aircraft. Alternatively, because of the balanced nature of the power distribution circuits 205, control system 255 can increase power to propulsion systems 105(1) and 105(12) to compensate for the entire power loss from battery 220(1), or could alternatively increase power to propulsion systems 105(6) and 105(7). Alternatively, control system 255 could take more complex action and increase power from battery 220(2) to propulsion systems 105(2) and 105(11), for example, to compensate for the failure. One of skill in the art having the benefit of this disclosure will appreciate the many different options controller can use to compensate for the loss of battery 220(1).

Figure 4:
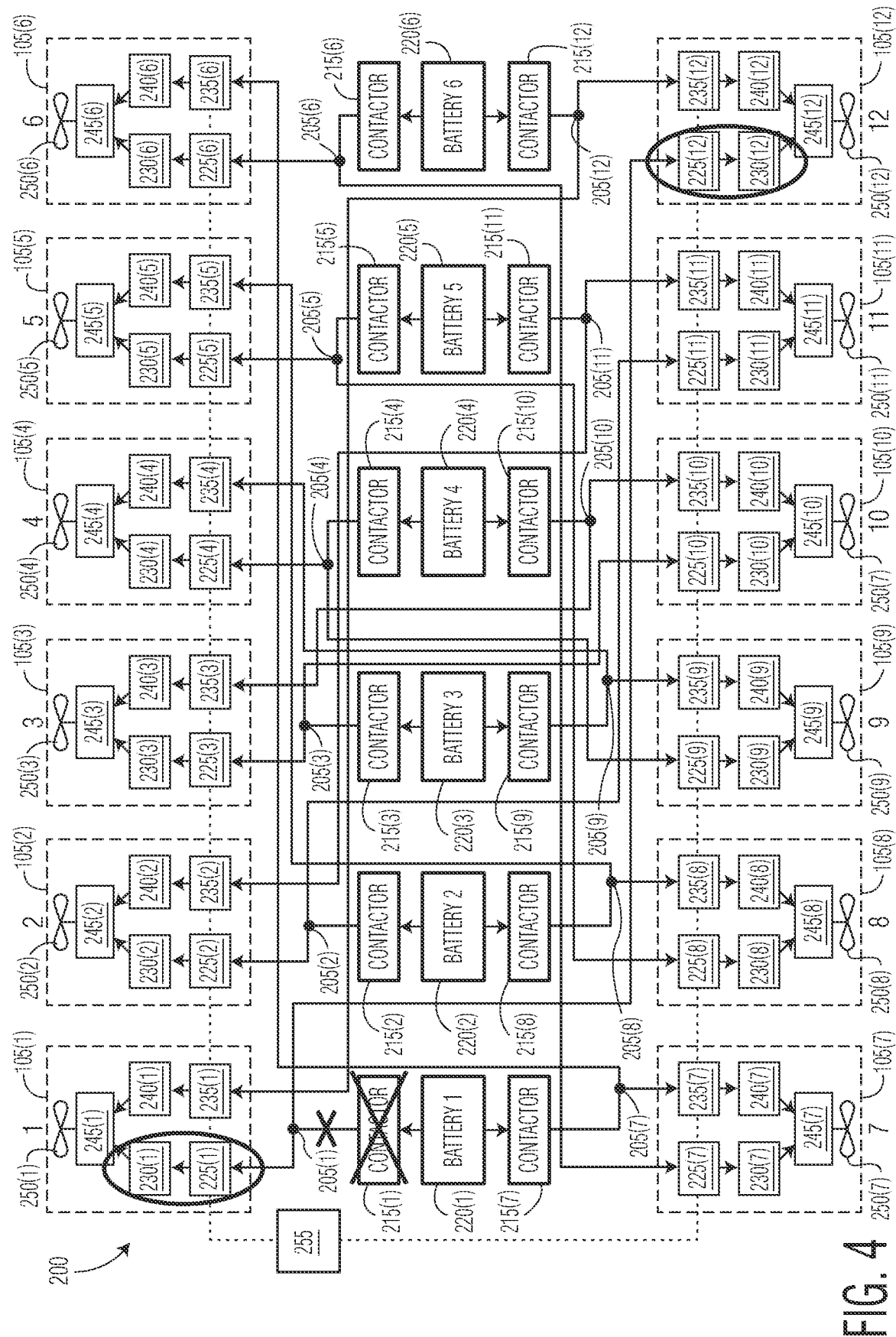
FIG. 4 is the schematic of the power distribution system shown in FIG. 2 showing the effect of a failure of a contactor or a short in the power distribution bus.

FIG. 4 illustrates power distribution system 200 shown in FIG. 2, however in FIG. 4 battery contactor 215(1) has failed and/or there is a short within power distribution circuit 205(1). As shown in FIG. 3, contactor 215(1) can be opened once the failure is detected which cuts off power from power distribution circuit 205(1) which supplies power to balanced propulsion systems 105(1) and 105(12). Thus power is reduced to aircraft 100 in a balanced matter. Because contactor 215(1) breaks the connection between the failure and battery 220(1), the battery can still supply power to power distribution circuit 205(7) and propulsion systems 105(6) and 105(7) via contactor 215(7).

Figure 5:
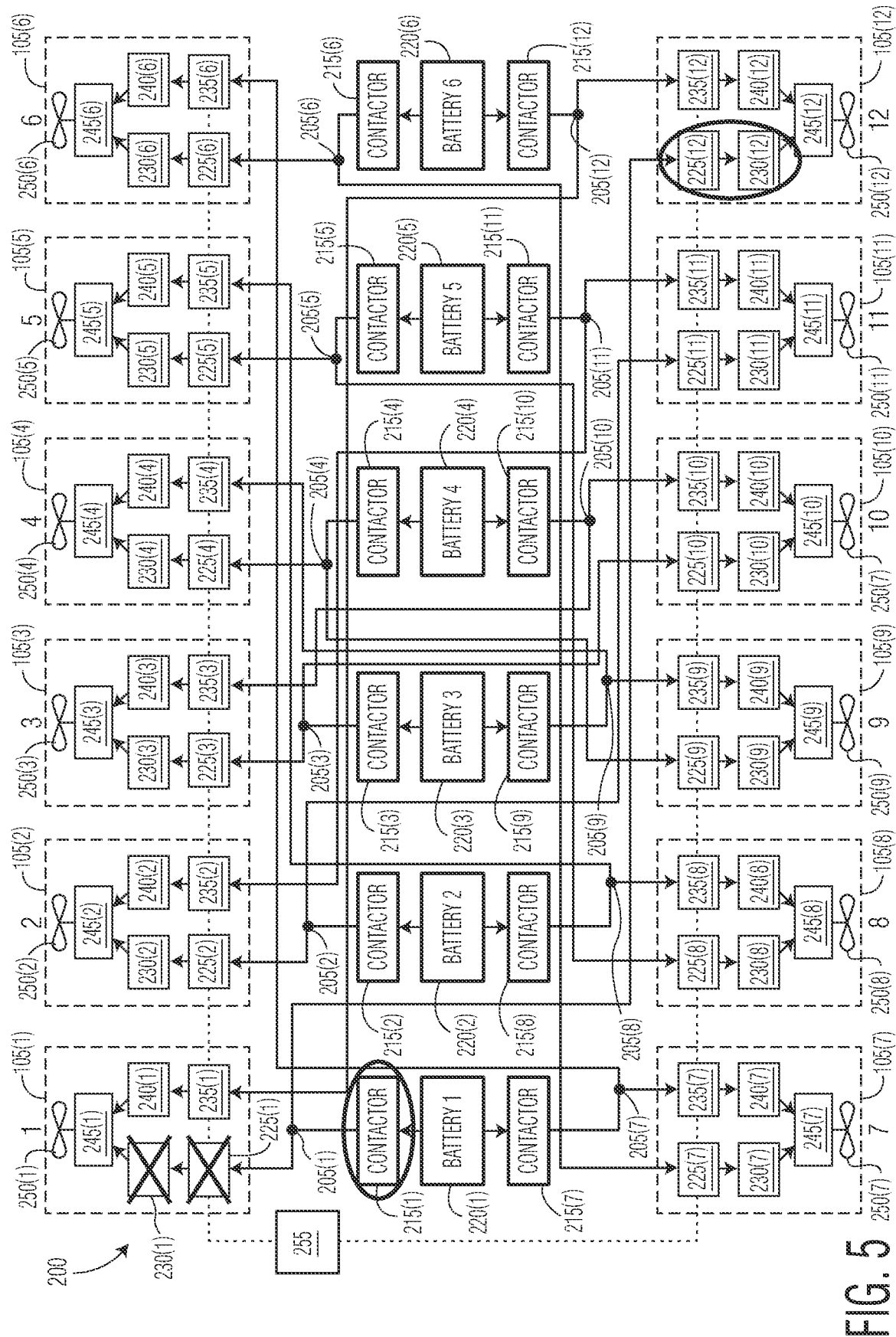
FIG. 5 is the schematic of the power distribution system shown in FIG. 2 showing the effect of a shorted inverter or motor winding.

FIG. 5 illustrates power distribution system 200 shown in FIG. 2, however in FIG. 5 primary controller 225(1) and/or primary winding 230(1) has failed. As shown in FIG. 5, contactor 215(1) can be opened once the failure is detected which cuts off power from power distribution circuit 205(1) and from battery 220(1) to primary controller 225(1) and primary winding 230(1). Propulsion system 105(1) can still receive ½ power from battery 220(6) via redundant power distribution circuit 205(12).

Figure 6:
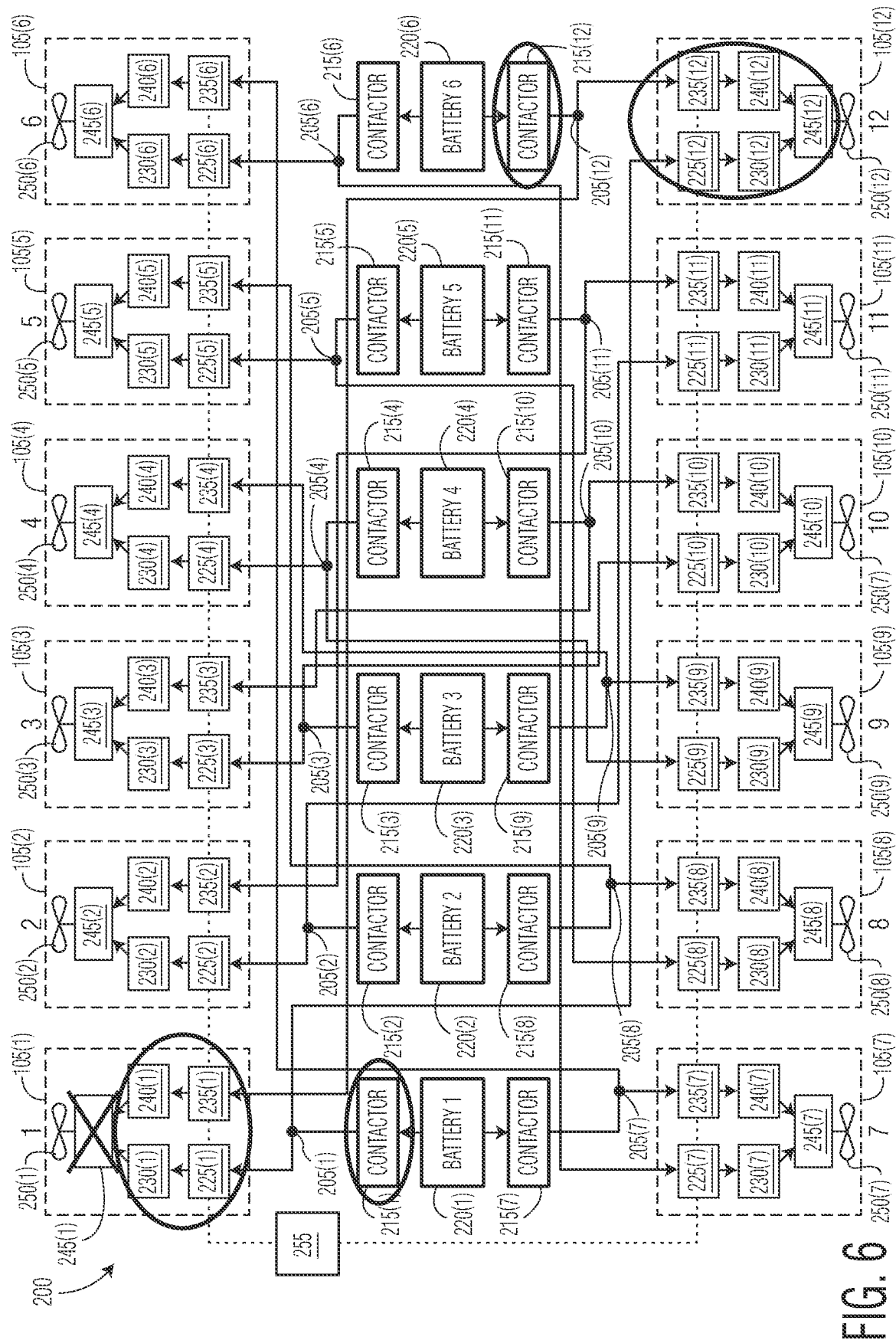
FIG. 6 is the schematic of the power distribution system shown in FIG. 2 showing the effect of a seized motor.

FIG. 6 illustrates power distribution system 200 shown in FIG. 2, however in FIG. 6 shaft 245(1) of first propulsion system 105(1) is seized. As shown in FIG. 6, contactor 215(1) can be opened once the failure is detected which cuts off power from power distribution circuit 205(1) and from battery 220(1). Similarly, contactor 215(12) can be opened which cuts off power from redundant power distribution circuit 205(12) and from battery 220(6). Because of the balanced arrangement, opening contactors 215(1), 215(12) also results in a complete loss of power delivered to propulsion system 105(12). Because the loss of power to propulsion systems 105(1) and 105(12) is balanced, aircraft 100 will not rotate in response to the failure and will only lose altitude or speed. Control system 255 can compensate for the failure in myriad ways, as described above.

Figure 7:
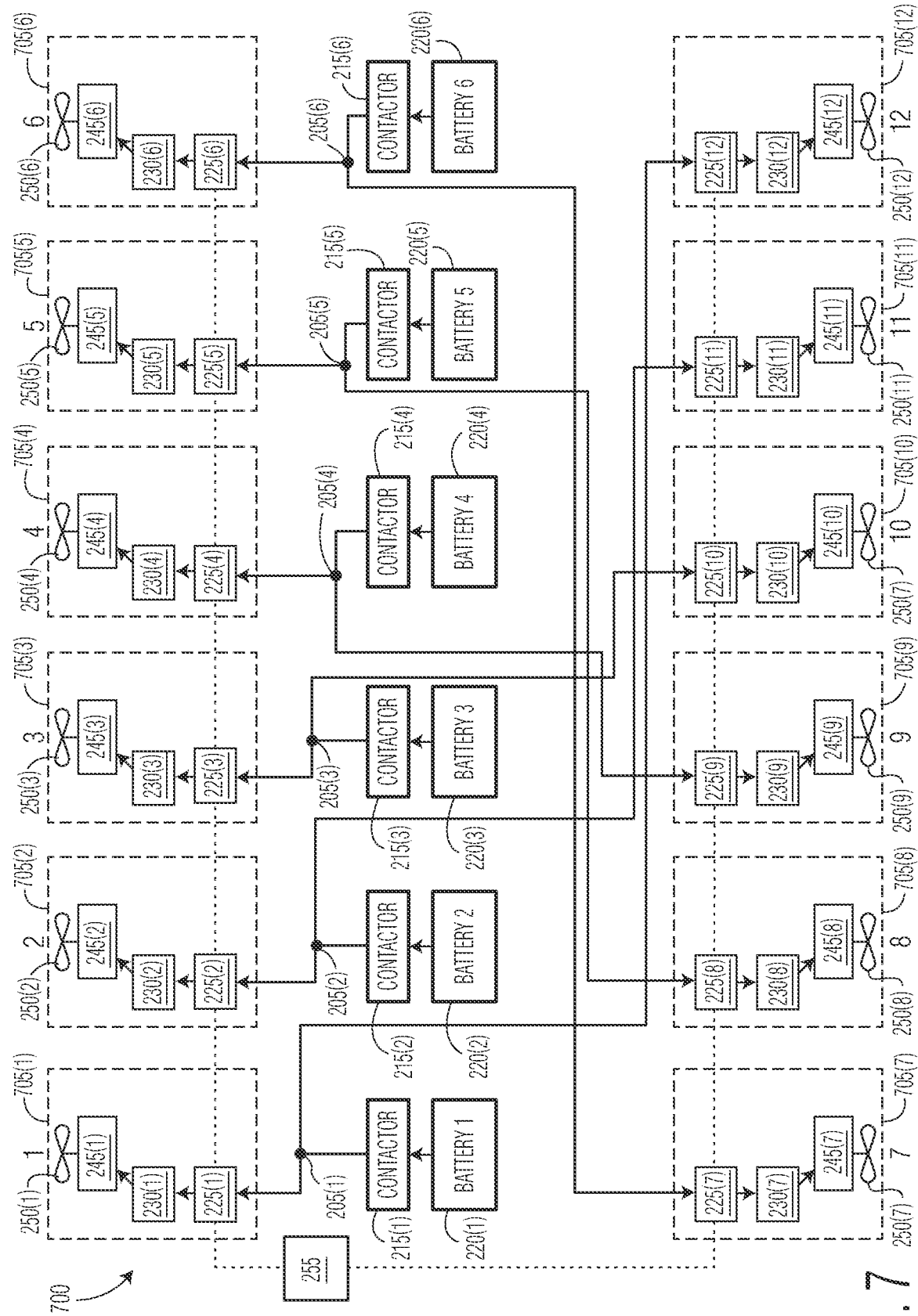
FIG. 7 is a simplified schematic of a power distribution system including six isolated primary power distribution circuits, and no redundant power distribution circuits, for the electronically powered aircraft shown in FIGS. 1A and 1B.

FIG. 7 illustrates a power distribution system 700 that is similar to power distribution system 200 shown in FIG. 2, however in FIG. 7 the redundant power distribution circuits 205(7)-205(12) have been removed. As shown in FIG. 7 each propulsion system 705(1)-705(12) has only a primary controller 225 and a primary winding 230. The primary power distribution circuits 205(1)-205(6) still supply power to propulsion systems 105 in a balanced matter. However, if a primary power distribution circuit 205(1)-205(6) fails there is no redundant power distribution circuit to continue to supply power to propulsion systems 705. For example, if battery 220(1) fails, contactor 215(1) opens and balanced propulsion systems 705(1) and 705(12) cease operation. Control system 255 can compensate by increasing power from battery 220(6) to balanced propulsion systems 705(6) and 705(7) or by taking myriad other actions.

Figure 8:
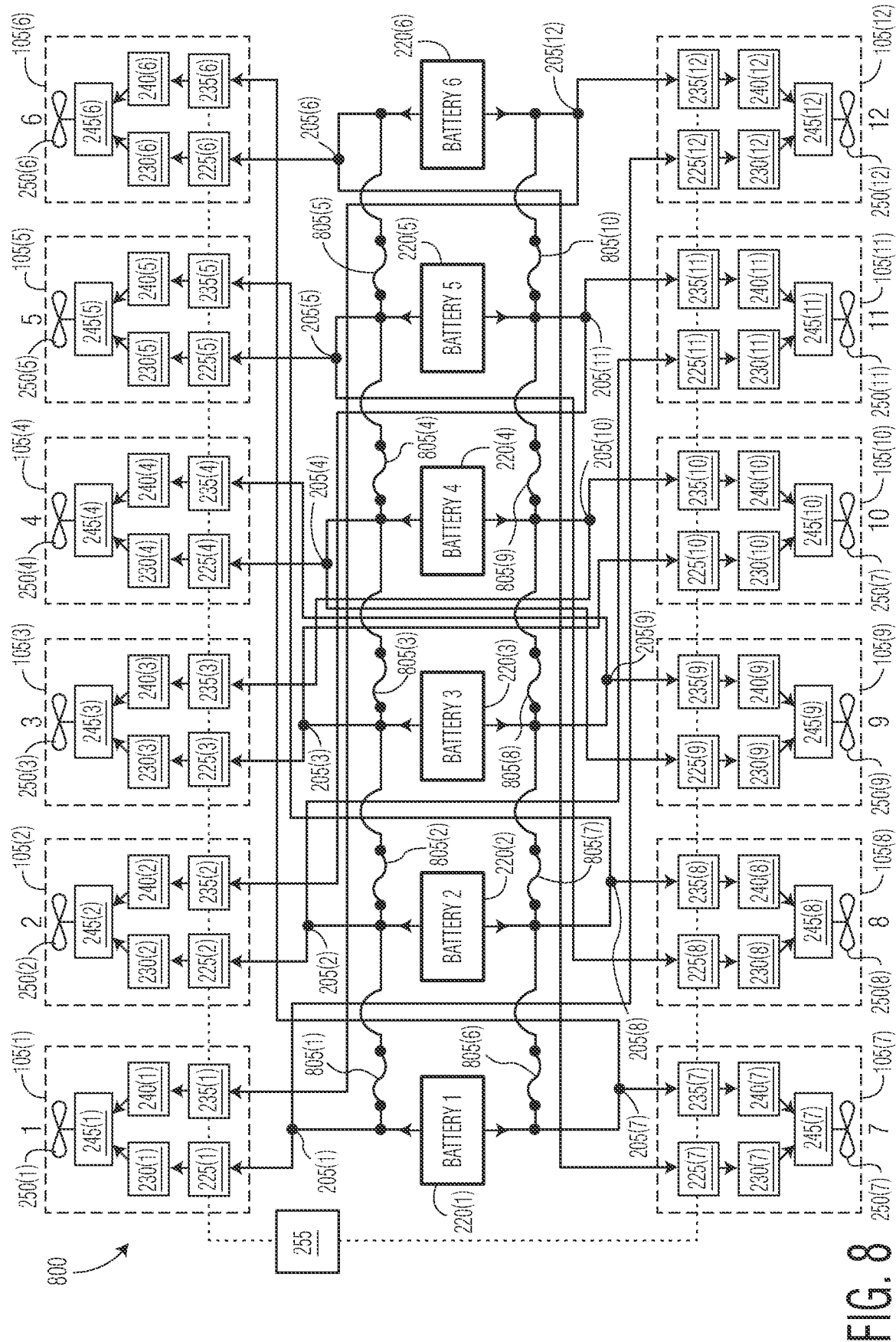
FIG. 8 is a simplified schematic of a power distribution system including six primary power distribution circuits and six redundant power distribution circuits coupled together via fuses to form a common power bus for the electronically powered aircraft shown in FIGS. 1A and 1B.

FIG. 8 illustrates a power distribution system 800 that is similar to power distribution system 200 shown in FIG. 2, however in FIG. 8 each primary power distribution circuit 205(1)-205(6) and each redundant power distribution circuit 205(7)-205(12) has been coupled together with a fuse 805 (1)-805(10). As shown in FIG. 8 first fuse 805(1) couples first and second primary power distribution circuits, 205(1), 205(2), respectively, second fuse 805(2) couples second and third primary power distribution circuits 205(2), 205(3), respectively, and similar connections are made for third fuse through fifth fuse, 805(3)-805(5), respectively. Similarly, redundant power distribution circuits 205(7)-205(12) are coupled together with sixth fuse 805(6) that couples first and second redundant power distribution circuits 205(7), 205(8), respectively, seventh fuse 805(7) that couples second and third redundant power distribution circuits 205(8), 205(9), respectively, and similar connections are made for eighth fuse through tenth fuse, 805(8)-805(10), respectively.

Fuses 805 result in all power distribution circuits 205 having a common voltage level as they are all electrically coupled together. This arrangement enables the even discharge of batteries 220 and power sharing along the common bus. In the event of a shorted battery failure, e.g., battery 220(2), first fuse 805(1), second fuse 805(2), sixth fuse 805(6) and seventh fuse 805(7) blow, isolating first battery 220(1) from batteries 220(3)-220(6). Essentially, a failure causes the failed power distribution circuits to "island" as a result of the fuses on either side of the failure blowing. In some embodiments contactors can be included, as shown in FIG. 2 to decouple each battery from primary and/or redundant power distribution circuits.

Figure 9:
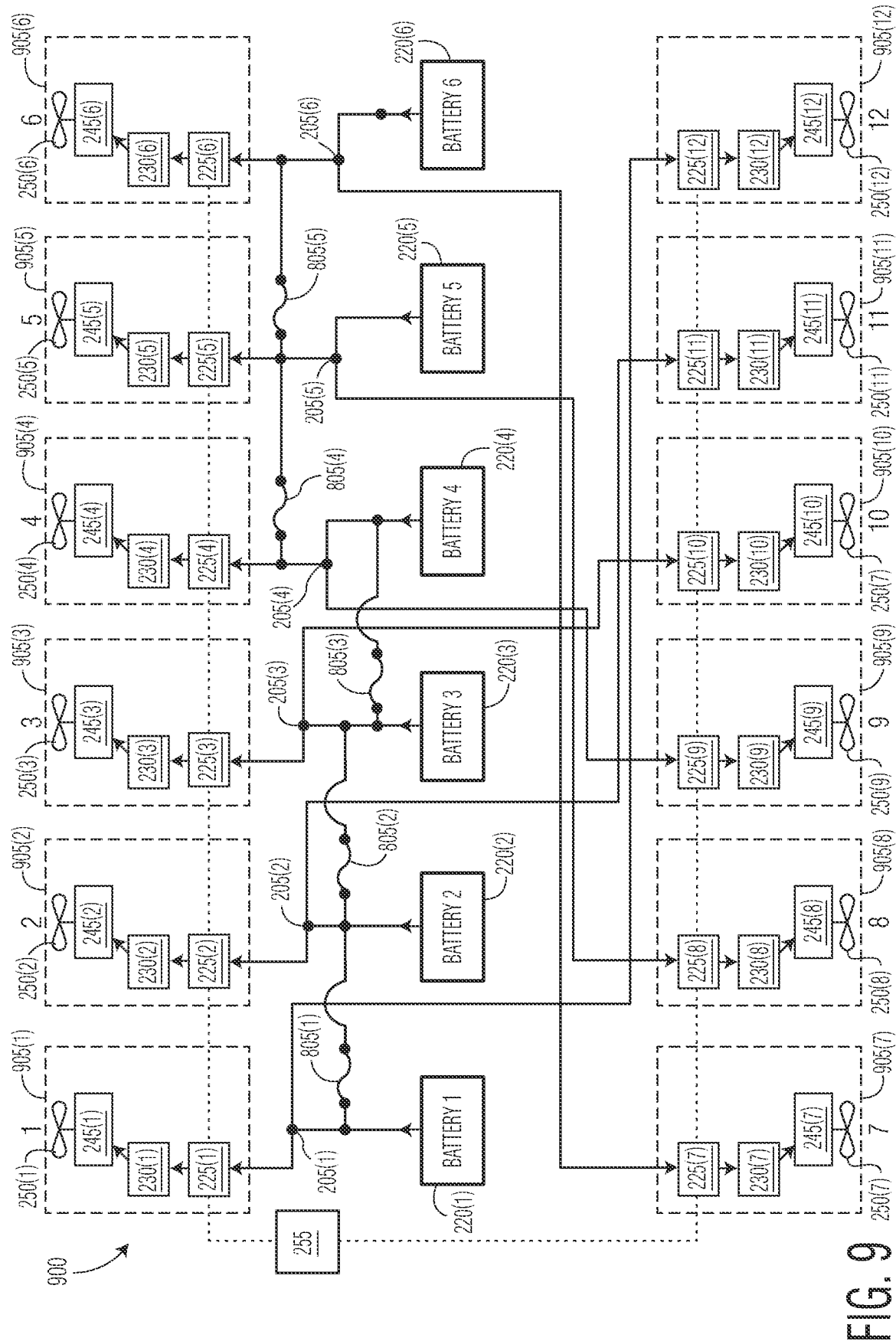
FIG. 9 is a simplified schematic of a power distribution system including six isolated primary power distribution circuits coupled together via fuse to form a common power bus, for the electronically powered aircraft shown in FIGS. 1A and 1B.

FIG. 9 illustrates a power distribution system 900 that is similar to power distribution system 800 shown in FIG. 8 and power distribution system 200 shown in FIG. 2, however in FIG. 9 the redundant power distribution circuits 205(7)-205(12) have been removed. As shown in FIG. 9 each propulsion system 905 has only a primary controller 225 and a primary winding 230. Primary power distribution circuits 205(1)-205(6) are each coupled together via fuses

805(1)-805(5) to form a common bus and supply power to propulsion systems 905 in a balanced matter. Fuses 805 result in all power distribution circuits 205 having a common voltage level as they are all electrically coupled together. This arrangement enables the even discharge of batteries 220 and power sharing along the common bus. Similar to FIG. 8, in the event of a failure, the failed power distribution circuits and/or battery is "islanded" through the blowing of one or more fuses on either side of the failure. In some embodiments contactors can be included, as shown in FIG. 2 to decouple each battery from primary and/or redundant power distribution circuits.

Referring back to FIG. 2, six batteries 220(1)-220(6) are shown. Embodiments allows each of these batteries to include any suitable number of battery cells. For example, each of the batteries 220(1)-220(6) may have one respective battery module. In other embodiments, each of the batteries 220(1)-220(6) can include two respective battery modules. In this case, each of the batteries 220(1)-220(6) may be referred to as battery packs, where each battery pack includes a plurality of battery modules, and each module includes one or more battery cells.

Figure 10:
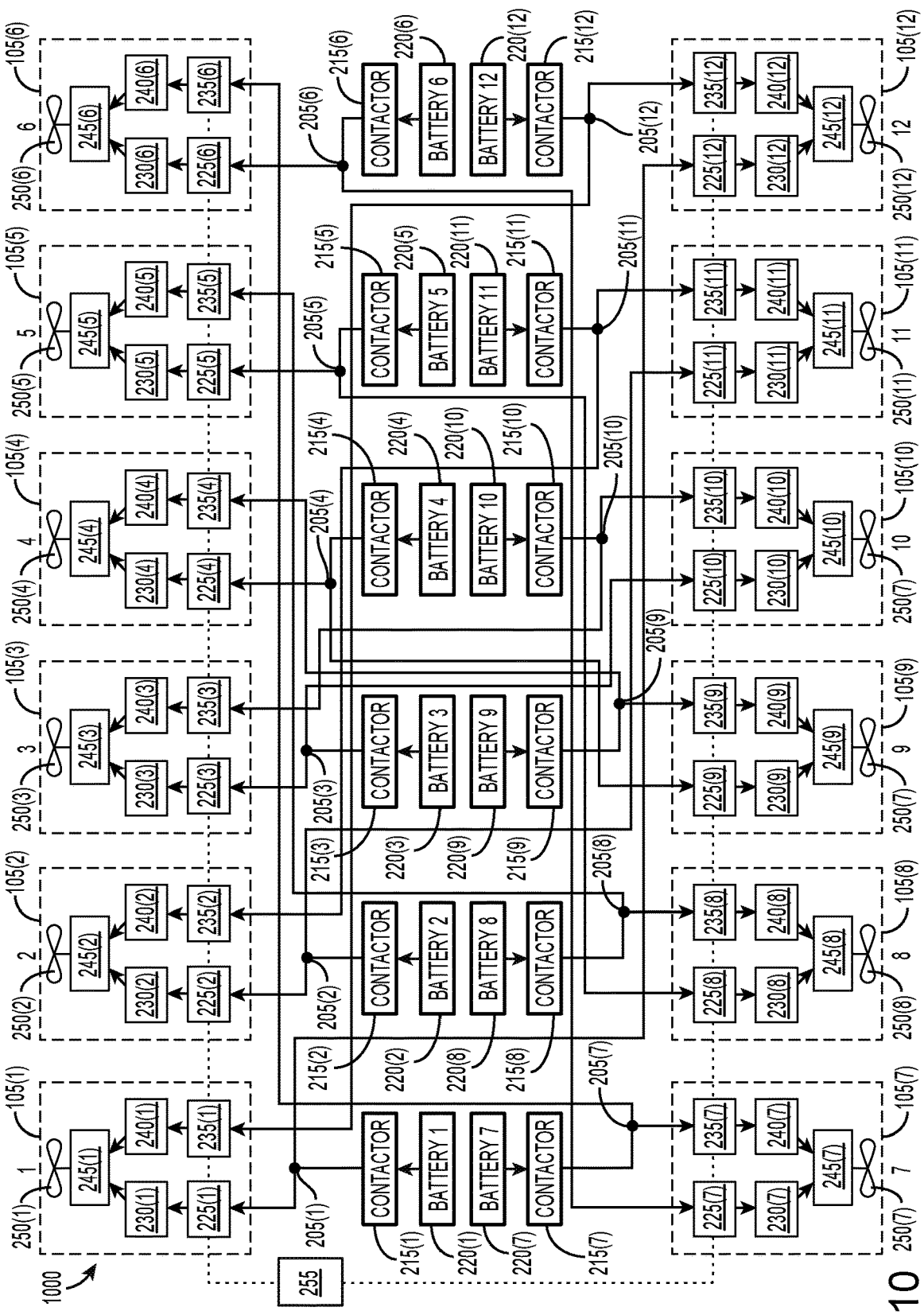
FIG. 10 is a simplified schematic of a power distribution system including twelve batteries, for the electronically powered aircraft shown in FIGS. 1A and 1B.

FIG. 10 illustrates a power distribution system 1000 that is similar to power distribution system 200 shown in FIG. 2, however in FIG. 10, there are twelve batteries 220(1)-220(12) instead of six. In some embodiments, each of the twelve batteries 220(1)-220(12) includes one battery module. Accordingly, if each of the six batteries 220(1)-220(6) in FIG. 2 is a battery pack with two battery modules, FIG. 10 shows each battery module so that for a given battery shown in FIG. 2, the two battery modules are now shown to be separate from one another. For example, battery 1 220(1) with two battery modules from FIG. 2 becomes battery 1 220(1) with one battery module and battery 7 220(7) with one battery module in FIG. 10. Thus, the total number of battery modules may be twelve in both cases, but the configuration, packaging, and/or wiring may be different.

As shown in FIG. 10, the power distribution circuits 205(1)-205(12) and contactors 215(1)-215(12) can remain configured similar to FIG. 2. However, each battery is now connected to a single contactor, instead of two contactors. As a result, instead of a primary power distribution circuit and a redundant power distribution circuit sharing a battery power source, each primary power distribution circuit and each redundant power distribution circuit will be coupled to its own dedicated battery. Further, each battery now supplies power to two propulsion systems in FIG. 10 as opposed to four propulsion systems in FIG. 2. For example, in FIG. 2, battery 1 220(1) supplies power to propulsion systems 105(1) and 105(12) through primary power distribution circuit 205(1) and to propulsion systems 105(6) and 105(7) through redundant power distribution circuit 205(7). In FIG. 10, battery 1 220(1) still supplies power to propulsion systems 105(1) and 105(12) through primary power distribution circuit 205(1). However, battery 7 220(7) now supplies power to propulsion systems 105(6) and 105(7) through redundant power distribution circuit 205(7).

According to some embodiments, the configuration shown in FIG. 10 can still supply at least a same or similar amount of power to the propulsion systems 105(1)-105(12) as in FIG. 2. Even though each of the twelve batteries 220(1)-220(12) may include one battery module instead of two battery modules, each of the twelve batteries 220(1)-220(12) now provide power to two propulsion systems instead of four propulsion systems, so the power draw per battery module remains the same or similar to the configuration illustrated in FIG. 2.

With the arrangement of power distribution circuits 205(1)-205(12) and contactors 215(1)-215(12) being similar as in FIG. 2, the various advantages of related to redundancy, balance, and stable failure modes described above are still valid for the configuration illustrated FIG. 10. A further advantage is also provided by the twelve-battery configuration of FIG. 10. In FIG. 2, if one battery module fails, that entire battery pack (e.g., which may include one or more healthy battery cells) is disconnected and isolated. For example, the failure mode illustrated in FIG. 3 may be caused by the failure of one of two battery modules in the battery pack. In contrast, in FIG. 10, if one battery module fails, that battery module can be disconnected and isolated individually, while the other nearby battery module can remain operating. For example, if battery 1 220(1) fails (similar to the failure mode shown in FIG. 3), battery 7 220(7) can continue operating. Thus, instead of a $1/6$ reduction in power, there is only a $1/12$ reduction in power. As discussed above, if one battery fails, the other batteries may be operated to provide a higher power output that compensates for the loss of the failed battery. In FIG. 2, the remaining batteries may be controlled to provide an extra $1/5$ of power (for a total power output that is $6/5$ or 120% of normal) on average. In contrast, in FIG. 10, the remaining batteries may be controlled to provide an extra $1/11$ of power (for a total power output that is $12/11$ or 109% of normal) on average. This smaller demand for increased power output on each battery module may be easier to manage and more reliable.

In FIG. 2, if two batteries fail, the remaining batteries need to provide even more power. With four of six batteries remaining, the remaining batteries would need to provide an extra $2/4$ of power (for a total power output that is $6/4$ or 150% of normal) on average. Operating a battery at 150% power output may not be possible or may be considered unsafe. Accordingly, the six-battery configuration may not tolerate two batteries failing simultaneously. In contrast, in FIG. 10, if two batteries (each including one battery module) fail, there are still ten remaining batteries (or battery modules). With 10 of 12 batteries remaining, the remaining batteries would need to provide an extra $2/10$ of power (for a total power output that is $12/10$, $6/5$, or 120% of normal) on average. Thus, in FIG. 10, if two batteries simultaneously, the increased burden (120% power) on the remaining batteries is still as low as the single-cell failure case of FIG. 2. Accordingly, the twelve-battery configuration may be able to tolerate two batteries failing simultaneously. According to some embodiments, the twelve-battery configuration of FIG. 10 may be able to tolerate the simultaneous failure of two batteries, three batteries, four batteries, or any other suitable number of batteries without causing catastrophic failure. Thus, even if the number of battery modules is the same, the configuration of those battery modules shown in FIG. 10 can tolerate a higher failure rate of batteries, improving aircraft safety and making it easier to prove that the aircraft meets aviation safety standards.

Figure 11:
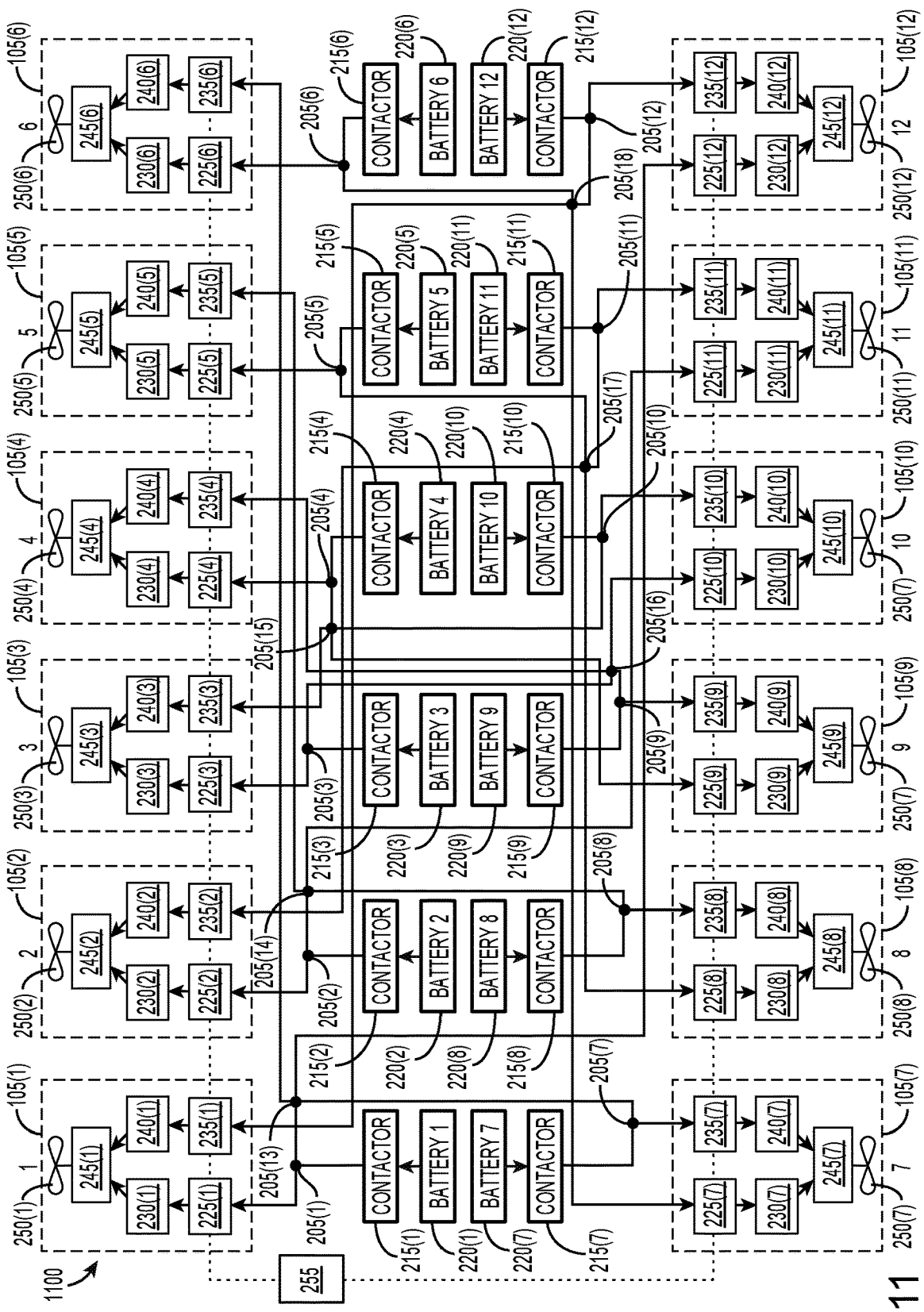
FIG. 11 is a simplified schematic of a power distribution system including six pairs of power distribution circuits where each pair coupled together via fuses to form six isolated power busses for the electronically powered aircraft shown in FIGS. 1A and 1B.

FIG. 11 illustrates a power distribution system 1100 that is similar to power distribution system 1000 shown in FIG. 10, however in FIG. 11, pairs of power distribution circuits are coupled together through a common electrical bus. Specifically, each primary power distribution circuit shares a common bus with a paired corresponding redundant power distribution circuit, so that there are six electrical busses. For example, a first common bus illustrated by wire connection 205(13) couples the primary power distribution circuit 205(1) with the redundant power distribution circuit 205(7), a second common bus illustrated by wire connection 205(14)

couples the primary power distribution circuit 205(2) with the redundant power distribution circuit 205(8), a third common bus illustrated by wire connection 205(15) couples the primary power distribution circuit 205(3) with the redundant power distribution circuit 205(9), a fourth common bus illustrated by wire connection 205(16) couples the primary power distribution circuit 205(4) with the redundant power distribution circuit 205(10), a fifth common bus illustrated by wire connection 205(17) couples the primary power distribution circuit 205(5) with the redundant power distribution circuit 205(11), and a sixth common bus illustrated by wire connection 205(18) couples the primary power distribution circuit 205(6) with the redundant power distribution circuit 205(12). As a result, instead of twelve isolated power distribution circuits and batteries 220(1)-(12) (as shown in FIG. 10), there can be six isolated power distribution circuits and six sets of paired batteries in FIG. 11. Also battery 220(1)-(12) and each contactor 215(1)-(12) can be electrically coupled to a plurality of (e.g. four) propulsion systems 105(1)-105(12).

The common electrical busses 205(13)-205(18) result in the primary power distribution circuit and the paired redundant power distribution circuit having a common voltage level that passively balances, as they are electrically coupled together. This arrangement enables the even discharge of each set of paired batteries. For example, battery 1 220(1) and battery 7 220(7) evenly discharge together as they share a common bus. This advantageously makes it simpler and easier to maintain batteries 220(1)-(12) at a similar charge state. Instead of separately monitoring the charge state and adjusting battery operation for twelve separate batteries to actively balance twelve charge states, the control system 255 can monitor and control six sets of paired batteries actively balance six charge states. It is simpler to control six environments than twelve environments.

Embodiments allow contactors 215(1)-215(12) and/or fuses to be included so that if one battery cell fails, it can be isolated from the paired battery cell. FIG. 11 is similar to FIG. 2 in that two battery cells can together provide power to four propulsion systems 105(1)-105(12), and it is similar to FIG. 10 in that one battery failure can be isolated without having to sacrifice the second paired battery. Advantageously, in the event of a battery failure, the remaining battery on the common bus can still provide power to all four of the coupled propulsion systems.

Figure 12:
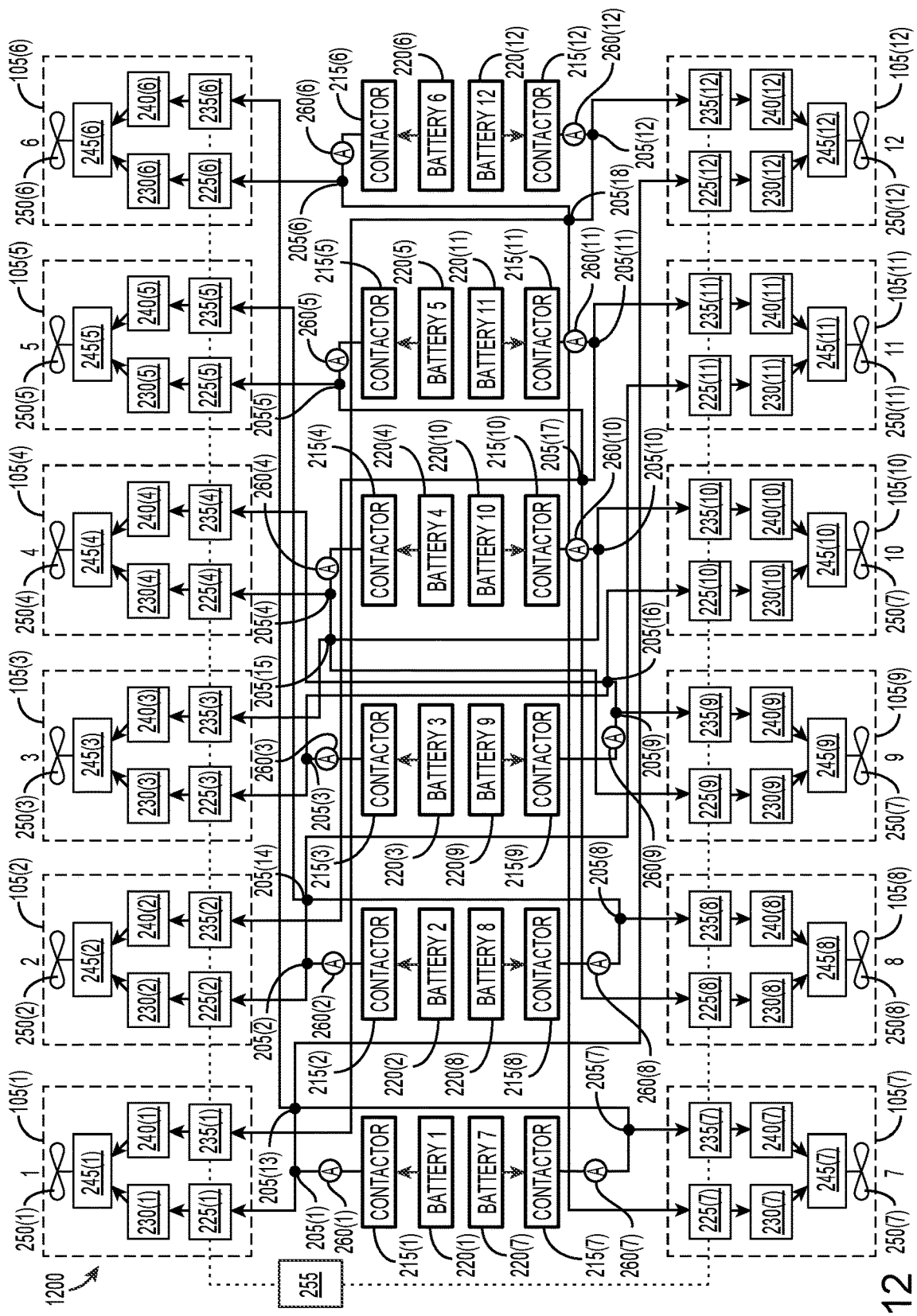
FIG. 12 is a simplified schematic of a power distribution system including twelve batteries and twelve current meters for the electronically powered aircraft shown in FIGS. 1A and 1B.

FIG. 12 illustrates a power distribution system 1200 that is similar to power distribution system 1100 shown in FIG. 11, however FIG. 12 includes twelve current meters 260(1)-(12). Each current meter 260(1)-(12) can be located between its corresponding battery and power distribution circuits. In embodiments where contactors 215(1)-(12) are also included, the current meter can be positioned on any suitable side of the contactor. In some embodiments, a current meter and a contactor can be combined as one component.

The current meters 260(1)-(12) provide way to detect and isolate a malfunctioning battery using simple electronics (e.g., instead of software). If one of the batteries 220(1)-(12) experiences thermal runaway, it may produce a decreasing voltage output. With two batteries coupled to a common bus, the battery undergoing thermal runaway may become overpowered by a normally-operating paired battery, such that electrical current may backflow into the failing battery. A current meter 260(1)-(12) can measure electric current, and can be used to detect if electrical current is flowing in the wrong direction (or otherwise exceeding a limit). For example, if battery 7 220(7) is experiencing thermal runaway, the current meter 260(7) at battery 1 220(7) may detect a reverse current (or detect that a minimum threshold current is not satisfied). In this case, battery 7 220(7) can be disconnected (e.g., by contactor 215(7)) or otherwise isolated from the system. Similarly, if too much current is detected (e.g., a maximum threshold current is exceeded) at current meter 260(7), battery 7 220(7) can be disconnected.

It can be advantageous to use simple electronic circuits, such as current meters 260(1)-(12), instead of other complex electronics (e.g., field-programmable gate arrays) or software-based tools that require complicated and labor-intensive redundancies when used for safety-critical functions in aviation.

Figure 13A:
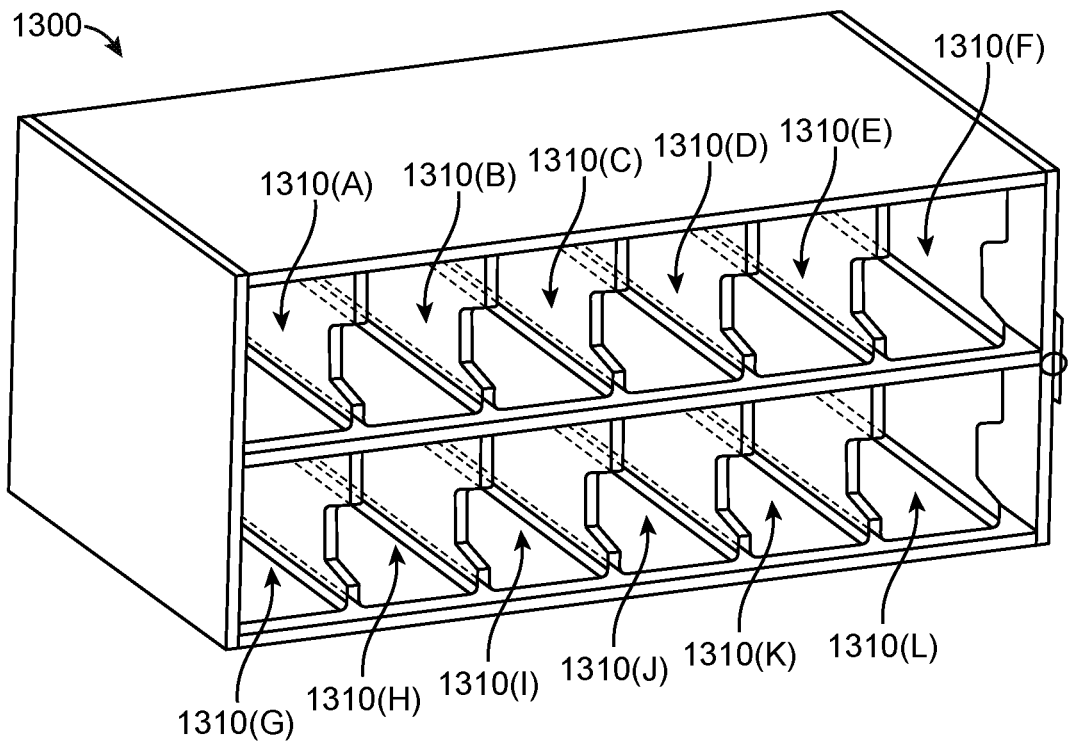
FIGS. 13A and 13B illustrate two examples of battery housings, for the electronically powered aircraft shown in FIGS. 1A and 1B.
Figure 13B:
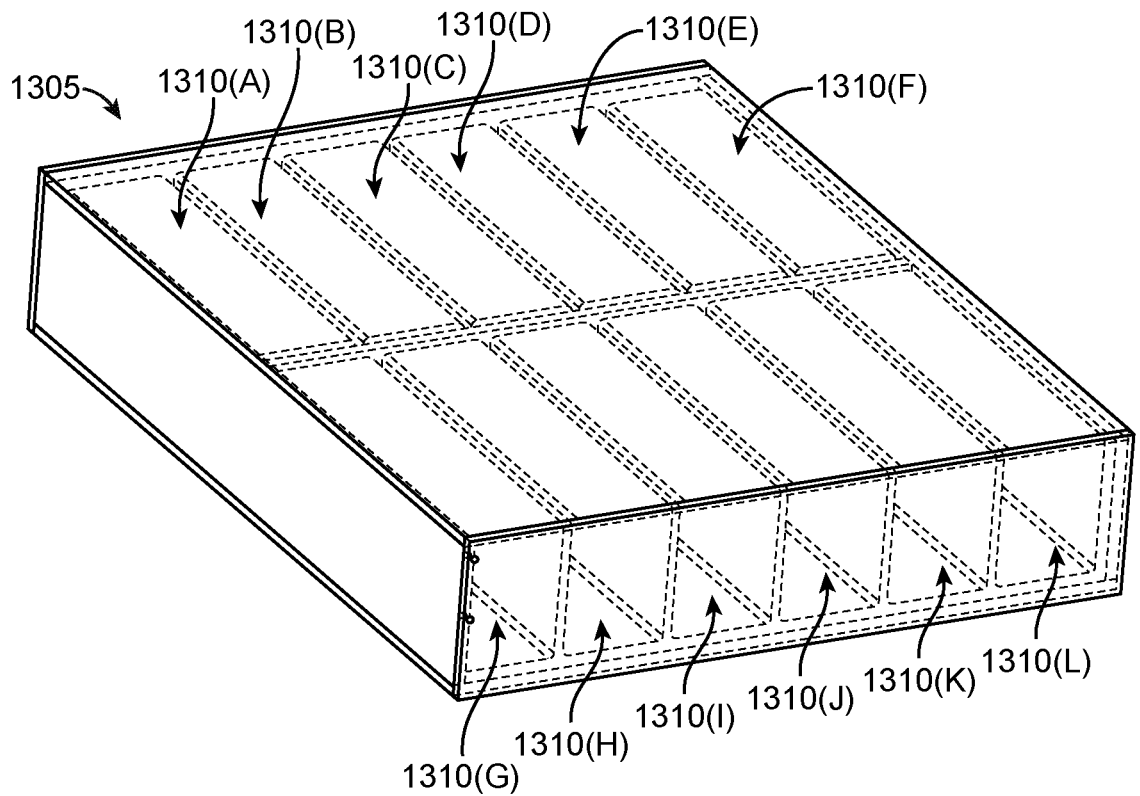

FIGS. 13A and 13B illustrate two examples of battery housings, according to embodiments. As shown in FIG. 13A, a stacked battery housing 1300 can provide twelve battery slots 1310(A)-(L), each of which can include space for one battery. The battery slots 1310(A)-(L) can be arranged in two rows of six battery slots each, where a first row of six battery slots is located below a second row of another six battery slots. All twelve battery slots 1310(A)-(L) may be located in the same vertical plane, but not the same horizontal plane.

As shown in FIG. 13B, a flat battery housing 1305 can provide the twelve slots 1310(A)-(L) in a different configuration. The slots 1310(A)-(L) can be arranged in two rows of six slots each, where a first row of six slots is located in front of a second row of another six slots. All twelve slots 1310(A)-(L) may be located in the same horizontal plane, but not the same vertical plane. As an example, the flat battery housing 1305 may have dimensions of about 41 inches long, about 42 inches wide, and about 8 inches high.

As can be seen in FIGS. 13A and 13B, both the stacked battery housing 1300 and the flat battery housing 1305 can house twelve batteries, even though the overall shapes are different. Certain shapes may be more suitable for different aircraft configurations, depending on, for example, the aircraft shape and size, and the shape and location of access points for loading and unloading the battery housing.

According to embodiments, the stacked battery housing 1300 and/or the flat battery housing 1305 can be used in combination with any of the power distribution systems shown in FIGS. 2-12. Further, embodiments allow multiple battery housings to be included in the same aircraft. For example, two or more flat battery housings 1305, each including any suitable number of batteries, can be stacked vertically within a battery compartment space of an aircraft. If a battery compartment space (which may be located in the rear end of the fuselage) of an aircraft has a volume shaped as or like a cube, then the volume can be more fully utilized by vertical stacking of two or more flat battery housings 1305.

In other embodiments, two or more flat battery housings 1305, each including any suitable number of batteries, can be arranged or stacked horizontally within a battery compartment space of an aircraft. For example, two or more flat battery housings 1305 can each be placed in an upright position adjacent to one another. In an upright position, a flat battery housing 1305 may couple to a floor area of the aircraft and/or a ceiling area of the aircraft. In addition to an upright position, each flat battery housing 1305 may be oriented parallel to the axis of the plane. As a result, each flat battery housing 1305 can extend from a front area of the battery compartment space toward a rear area of the battery compartment space, and such that the horizontal stack or arrangement of multiple flat battery housings 1305 spans from a left side of the aircraft to a right side of the aircraft.

Additionally, in some embodiments, a battery compartment space of an aircraft may include sufficient space and infrastructure to accommodate multiple rows of flat battery housings 1305. For example, two or more stacks (e.g., vertical stacks or horizontal stacks) of flat battery housings 1305 may be included within battery compartment space and adjacent to one another, with a first stack being positioned aft of a second stack, and so forth.

The flat battery housing 1305 configuration can advantageously allow the battery compartment space of an aircraft to be simplified. The flat battery housing 1305 can occupy most or all of the width and length of a battery compartment space. Thus, the flat battery housing 1305 can be sufficiently wide and/or long so as to contact or almost contact the walls of the battery compartment space. As a result, support structures (e.g., shelves, walls, coupling points, etc.) for the flat battery housing 1305 can be integrated into the walls, the ceiling, and/or the floor of the aircraft's battery compartment space, and there may be no need for more complex support structures within the internal volume of the battery compartment space (e.g., no need for a dividing wall). Simplifying the support structures in this way can reduce complexity, reduce overall weight, and apply weight loads to the side walls of the aircraft where there may already be load-supporting structures. Embodiments allow any suitable number or amount of support structures to be integrated into the battery compartment space (e.g., fuselage) of the aircraft so that one or more flat battery housings 1305 can be supported and/or stacked (e.g., either vertically stacked or horizontally stacked) within the battery compartment space.

FIGS. 14A-D illustrate a process for loading a flat battery housing 1305 into an aircraft 100, according to embodiments. A flat battery housing 1305 with twelve or any other suitable number of batteries may be stored in a battery compartment space at or toward the aft area (or rear end) of the fuselage of the aircraft 100. In order to insert the flat battery housing 1305 into this designated location, the flat battery housing 1305 may be passed through a door of the aircraft, and maneuvered into position at the aft end of the fuselage.

Figure 14A:
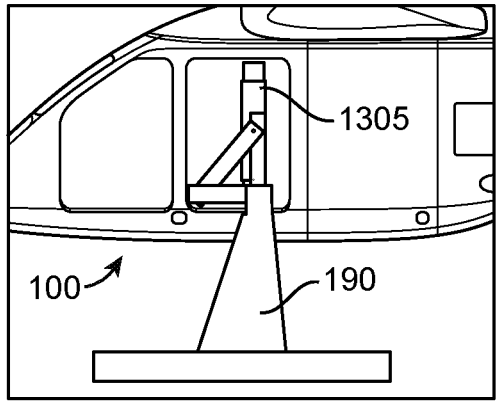
FIGS. 14A-D illustrate a process for loading a flat battery housing 1305 into an aircraft, according to embodiments.

As shown in FIG. 14A, a loading arm 190, which may be positioned at a landing pad, can insert the flat battery housing 1305 into the fuselage of the aircraft 100. The flat battery housing 1305 can be inserted through a passenger door, or through any other suitable opening or access point. In some embodiments, the passenger door may have a height that is equal to or greater than the length (e.g., which may be longest dimension) of the flat battery housing 1305, while the width of the passenger door may be less than the length the flat battery housing 1305. Accordingly, before inserting the flat battery housing 130, the loading arm 190 may rotate the flat battery housing 130 so that it has a vertical orientation, and then the loading arm 190 may move the flat battery housing 130 through the passenger door and into the fuselage.

The loading arm 190 can have any suitable number of configuration of joints, moving parts, and rotating parts to achieve the articulation and movements shown in the figures. In some embodiments, the loading arm 190 can include a ramp upon which the flat battery housing 1305 can be slid or otherwise used to move the flat battery housing 1305 from the ground up to the door of the aircraft 100. Internal fuselage components, such as seats and center consoles, may be removed before insertion and/or removal of the flat battery housing 1305 in order to provide sufficient open working space.

Figure 14B:
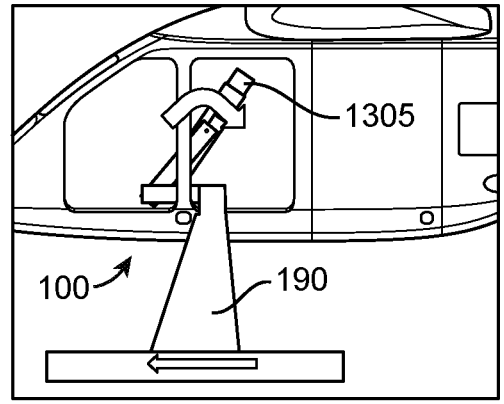

As shown in FIG. 14B, the loading arm 190 may translate and/or rotate the flat battery housing 1305 into a next position. For example, the loading arm 190 may rotate the flat battery housing 1305 into a horizontal orientation so that it may subsequently be inserted into a horizontal storage location. Additionally, the loading arm 190 may move the flat battery housing 1305 toward a front end of the fuselage to allow sufficient space for the flat battery housing 1305 to be rotated. Embodiments allow the rotation and rearward movement to happen at the same time or at different times.

Figure 14C:
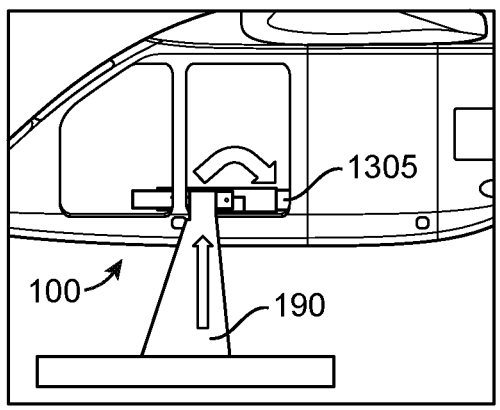

As shown in FIG. 14C, the loading arm 190 may finish rotating the flat battery housing 1305 once it reaches the horizontal position. At this time, the loading arm 190 may also vertically translate (e.g., lift or lower) the flat battery housing 1305 into a desired vertical position in preparation for insertion into a storage location at a certain height. In some embodiments, the flat battery housing 1305 can be raised or lowered to one of multiple (e.g., three, six, eight, or any other suitable number) possible vertical positions. For example, the flat battery housing 1305 may be stored at floor-level, or on a shelf at a higher position. In some embodiments, multiple flat battery housings 1305 may be stacked on each other vertically, so each subsequent flat battery housing 1305 may be pre-positioned at a slightly higher vertical position so that it can be placed above a previous flat battery housing 1305.

In other embodiments, instead of rotating the flat battery housing 1305 to a horizontal position, the loading arm 190 may rotate the flat battery housing 1305 to an upright position that is parallel to the front-back axis of the aircraft. This may be performed for embodiments where flat battery housings 1305 are horizontally arranged or stacked. For example, the flat battery housing 1305 can also be translated left or right in preparation for insertion to one of multiple (e.g., three, four, five, six, or any other suitable number) possible horizontal positions.

In embodiments with multiple rows or stacks of flat battery housings 1305, one or more flat battery housings 1305 may be inserted into positions at a further-aft row or stack before additional flat battery housings 1305 are inserted into positions at a further-forward row or stack.

Figure 14D:
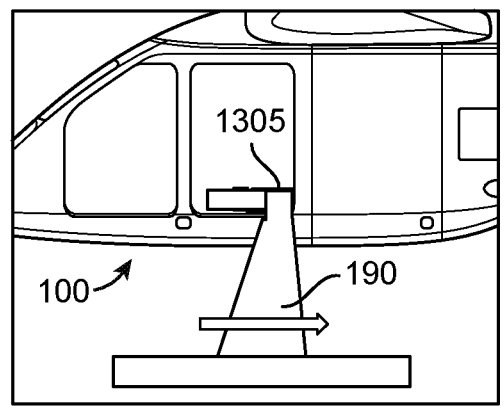

As shown in FIG. 14D, the loading arm 190 may insert the flat battery housing 1305 into a final position within a battery compartment space. In this example, the battery compartment space is located at or near the aft end (or rear end) of the fuselage of the aircraft 100, behind a passenger or cargo space. Accordingly, the loading arm 190 can horizontally move the flat battery housing 1305 into the battery compartment space at the aft end of the fuselage, and then the loading arm 190 can disengage the flat battery housing 1305 and exit the aircraft 100. A similar process can be performed in reverse to remove a flat battery housing 1305 from the aircraft 100.

Although aircraft 100 (see FIG. 1) is described and illustrated as one particular configuration of aircraft, embodiments of the disclosure are suitable for use with a multiplicity of aircraft. For example, any aircraft that uses two or more electronic propulsion systems can be used with embodiments of the disclosure. In some instances, embodiments of the disclosure are particularly well suited for use with aircraft that carry one or more persons because of the need for reliability, however the power distribution system disclosed herein is not limited to "manned" aircraft and can be used on any aircraft "manned" and "unmanned" of any size.

For simplicity, various electrical components, such as capacitors, current sense circuits, controller details, processors communications busses, memory, storage devices and other components of the power distribution system are not shown in the figures.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

With reference to the appended figures, components that can include memory (e.g., control or computing system 255, controllers 225, 235, etc.) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A power distribution system for an electrically powered aircraft, the power distribution system comprising:
   a plurality of batteries;
   a plurality of electric propulsion systems;
   a plurality of power distribution circuits, each coupling a respective battery of the plurality of batteries to two or more respective electric propulsion systems of the plurality of electric propulsion systems, the two or more respective electric propulsion systems positioned on the electrically powered aircraft to apply balanced forces to the electrically powered aircraft; and
   a plurality of electrical busses, each electrical bus coupling a respective pair of power distribution circuits from the plurality of power distribution circuits, and wherein the each of the plurality of electrical busses couple two respective batteries of the plurality of batteries to four electric propulsion systems of the plurality of electric propulsion systems.

2. The power distribution system of claim 1, further comprising:
   a plurality of contactors, each of which is coupled to a respective battery of the plurality of batteries and a respective electrical bus of the plurality of electrical busses, and each of which is configured to decouple their respective battery from their respective electrical bus.

3. The power distribution system of claim 1, further comprising:
   a plurality of current meters, each of which is coupled to a respective battery of the plurality of batteries, and each of which is configured to measure current entering or exiting the respective battery, such that the respective battery can be decoupled from its respective electrical bus of the plurality of electrical busses when a maximum threshold current is exceeded or a minimum threshold current is not satisfied.

4. The power distribution system of claim 3, wherein the plurality of batteries is twelve batteries, the plurality of electric propulsion systems is twelve electric propulsion systems, the plurality of power distribution circuits is twelve power distribution circuits, the plurality of electrical busses is six electrical busses, and the plurality of current meters is twelve current meters.

5. The power distribution system of claim 4, wherein each of the twelve batteries is one battery module.

6. The power distribution system of claim 1 wherein the balanced forces applied to the electrically powered aircraft are balanced with respect to a center of gravity (CG) of the electrically powered aircraft.

7. The power distribution system of claim 1 wherein the two or more respective electric propulsion systems are diametrically opposed from one another with respect to a center of gravity (CG) of the electrically powered aircraft.

8. A power distribution system for an electrically powered aircraft, the power distribution system comprising:
   a first battery;
   a second battery;
   a first electric propulsion system that generates a first force;
   a second electric propulsion system that generates a second force, wherein the first and the second forces are balanced with respect to a center of gravity of the electrically powered aircraft;
   a third electric propulsion system that generates a third force;
   a fourth electric propulsion system that generates a fourth force, wherein the third and the fourth forces are balanced with respect to the center of gravity of the electrically powered aircraft;
   a first power distribution circuit coupling the first battery to the first electric propulsion system and the second electric propulsion system; and
   a second power distribution circuit coupling the second battery to the third electric propulsion system and the fourth electric propulsion system; and
   an electrical bus coupling the first power distribution circuit and the second power distribution circuit, such that the electrical bus couples the first battery and the second battery to the first electric propulsion system, the second electric propulsion system, the third electric propulsion system, and the fourth electric propulsion system.

9. The power distribution system of claim 8, further comprising:
a first contactor coupled to the first battery and the electrical bus, the first contactor being configured to decouple the first battery from the electrical bus; and
a second contactor coupled to the second battery and the electrical bus, the second contactor being configured to decouple the second battery from the electrical bus.

10. The power distribution system of claim 8, further comprising:
a first current meter coupled to the first battery, the first current meter being configured to measure current entering or exiting the first battery, such that the first battery can be decoupled from the electrical bus when a maximum threshold current is exceeded or a minimum threshold current is not satisfied; and
a second current meter coupled to the second battery, the second current meter being configured to measure current entering or exiting the second battery, such that the second battery can be decoupled from the electrical bus when the maximum threshold current is exceeded or the minimum threshold current is not satisfied.

11. The power distribution system of claim 10, wherein the first battery has a single battery module, and the second battery has a single battery module.

12. The power distribution system of claim 8, wherein the first electric propulsion system is attached to a first wing of the electrically powered aircraft, the second electric propulsion system is attached to a second wing of the electrically powered aircraft, the third electric propulsion system is attached to the first wing of the electrically powered aircraft, and the fourth electric propulsion system is attached to the second wing of the electrically powered aircraft.

13. The power distribution system of claim 8, further comprising:
a third power distribution circuit coupling a third battery to the first electric propulsion system and the second electric propulsion system; and
a fourth power distribution circuit coupling a fourth battery to the third electric propulsion system and the fourth electric propulsion system, wherein the first power distribution circuit and the second power distribution circuit are both primary power distribution circuits, and wherein the third power distribution circuit and the fourth power distribution circuit are both redundant power distribution circuits.

14. The power distribution system of claim 8, further comprising:
a third power distribution circuit coupling a third battery to the first electric propulsion system and the second electric propulsion system; and
a fourth power distribution circuit coupling a fourth battery to the third electric propulsion system and the fourth electric propulsion system, wherein the first power distribution circuit and the fourth power distribution circuit are both primary power distribution circuits, and wherein the second power distribution circuit and the third power distribution circuit are both redundant power distribution circuits.

15. A method of powering an aircraft comprising:
providing electrical power to a first electric propulsion system and a second electric propulsion system via a first power distribution circuit coupled to a first battery, wherein the first electric propulsion system is attached to a left wing of the aircraft and the second electric propulsion system is attached to a right wing of the aircraft such that the first electric propulsion system and the second electric propulsion system apply respective forces that are balanced about a center of gravity of the aircraft; and
providing electrical power to third electric propulsion system and fourth electric propulsion system via a second power distribution circuit coupled to a second battery, wherein the third electric propulsion system is attached to the left wing of the aircraft and the fourth electric propulsion system is attached to the right wing of the aircraft such that the third electric propulsion system and the fourth electric propulsion system apply respective forces that are balanced about the center of gravity of the aircraft, wherein an electrical bus couples the first power distribution circuit and the second power distribution circuit, such that the electrical bus couples the first battery and the second battery to the first electric propulsion system, the second electric propulsion system, the third electric propulsion system, and the fourth electric propulsion system, wherein a first contactor is coupled to the first battery and the electrical bus, the first contactor being configured to decouple the first battery from the electrical bus, and a second contactor is coupled to the second battery and the electrical bus, the second contactor being configured to decouple the second battery from the electrical bus; and
decoupling the first battery from the electrical bus in response to failure of the first battery.

16. The method of claim 15, wherein the first battery has a single battery module, and the second battery has a single battery module.

17. An aircraft, comprising:
a fuselage;
a pair of wings coupled to opposite sides of the fuselage; and
a power distribution system, comprising:
a plurality of batteries;
a plurality of electric propulsion systems;
a plurality of power distribution circuits, each coupling a respective battery of the plurality of batteries to two or more respective electric propulsion systems of the plurality of electric propulsion systems, the two or more respective electric propulsion systems positioned on the aircraft to apply balanced forces to the aircraft; and
a plurality of electrical busses, each electrical bus coupling a respective pair of power distribution circuits from the plurality of power distribution circuits, and wherein the each of the plurality of electrical busses couple two respective batteries of the plurality of batteries to four electric propulsion systems of the plurality of electric propulsion systems.

18. The aircraft of claim 17, further comprising:
a battery housing positioned at an aft area of the fuselage, the battery housing including a plurality of battery slots, where each of the plurality of battery slots has space for one of the plurality of batteries, wherein the plurality of batteries are disposed within the plurality of battery slots.

19. The aircraft of claim 18, wherein the plurality of battery slots is twelve battery slots, wherein the battery housing is a stacked battery housing where the twelve battery slots are arranged in two rows of six battery slots in the same vertical plane, or the battery housing is a flat battery housing positioned in a horizontal orientation with the twelve battery slots arranged in two rows of six battery slots in the same horizontal plane.

20. The power distribution system of claim 1, wherein each set of two batteries the plurality of batteries is coupled to a corresponding unique set of four electric propulsion systems of the plurality of electric propulsion systems, such that each set of four electric propulsion systems of the plurality of electric propulsion systems is a different subset of the plurality of electric propulsion systems.

* * * * *